United States Patent [19]

Matsuo et al.

[11] Patent Number: 5,258,485

[45] Date of Patent: Nov. 2, 1993

[54] AROMATIC POLYETHERS, FLUORESCENT RESIN COMPOSITIONS CONTAINING SAME, AND PROCESSES FOR PREPARING SAME

[75] Inventors: Shigeru Matsuo; Naoto Yakoh; Shinji Chino, all of Chiba, Japan

[73] Assignee: Idemitsu Kosan Company Limited, Tokyo, Japan

[21] Appl. No.: 892,047

[22] Filed: Jun. 2, 1992

Related U.S. Application Data

[62] Division of Ser. No. 334,494, Apr. 7, 1989, Pat. No. 5,153,306.

Foreign Application Priority Data

| Apr. 8, 1988 | [JP] | Japan | 63-086636 |
| May 26, 1988 | [JP] | Japan | 63-129189 |
| Jun. 30, 1988 | [JP] | Japan | 63-163755 |
| Aug. 22, 1988 | [JP] | Japan | 63-107583 |
| Sep. 12, 1988 | [JP] | Japan | 63-228272 |
| Sep. 13, 1988 | [JP] | Japan | 63-230999 |
| Sep. 19, 1988 | [JP] | Japan | 63-234363 |
| Feb. 20, 1989 | [JP] | Japan | 1-40034 |

[51] Int. Cl.$^5$ ............................................. C08G 63/06

[52] U.S. Cl. ................................. 528/206; 528/125; 528/128; 528/171; 528/174; 528/208; 528/211; 528/271; 524/500

[58] Field of Search ............... 528/206, 208, 125, 205, 528/128, 171, 174, 211, 271; 524/500

[56] References Cited

U.S. PATENT DOCUMENTS

| 4,709,008 | 11/1987 | Shimp | 528/210 |
| 5,080,698 | 1/1992 | Krizan | 528/206 |
| 5,089,340 | 2/1992 | Matsuo | 528/206 |
| 5,149,581 | 9/1992 | Matsuo | 528/206 |
| 5,153,306 | 10/1992 | Matsuo | 528/206 |

Primary Examiner—John Kight, III
Assistant Examiner—P. Hampton-Hightower
Attorney, Agent, or Firm—Armstrong, Westerman, Hattori, McLeland & Naughton

[57] ABSTRACT

New and useful aromatic polyethers, which are high in glass transition temperatures, possess excellent mechanical properties, thermal resistance, solvent resistance, and generate fluorescence, are described. Also described are fluorescent resin compositions containing the aromatic polyethers. Processes for preparing the aromatic polyethers and the fluorescent resin compositions are also described.

6 Claims, 7 Drawing Sheets

AROMATIC POLYETHERS, FLUORESCENT RESIN COMPOSITIONS CONTAINING SAME, AND PROCESSES FOR PREPARING SAME

This is a division of application Ser. No. 07/334,494 filed Apr. 7, 1989 now U.S. Pat. No. 5,153,306.

BACKGROUND OF THE INVENTION

1. Field of the Invention

The present invention relates to novel aromatic polyethers, fluorescent resin compositions containing the same, and processes for preparing the same.

More particularly, the present invention relates to the aromatic polyethers which are particularly high in glass transition temperatures, possess excellent mechanical properties, thermal resistance, and solvent resistance, as well as generate fluorescence. Accordingly, the aromatic polyethers according to the present invention are suitable for use with materials for parts and display materials in the electric, electronic, mechanical, and automobile fields.

Furthermore, the fluorescent resin compositions containing the novel aromatic polymers according to the present invention cause no bleeding of a fluorescent ingredient and possess a favorable physical strength and thermal resistance as well as generate strong fluorescence. The resin compositions are practically advantageous for use as display materials and printing ink for advertisement, decoration and the like.

2. Description of Related Art

Recently, engineering resins with a variety of chemical structures have been developed and they are employed in the wide field ranging, for example, from automobile, electric and electronic, and precision machinery fields to office automation instrument and optical communication instrument fields. Although many aromatic polyether resins of the engineering plastics have favorable properties in some areas, they are still insufficient in many areas. And strong demands have been made to develop new materials with a variety of highly improved properties which satisfy performance demanded by users.

As such aromatic polyether resins are known a variety of aromatic polyether ether ketones, aromatic polyether sulfones, and aromatic polycyanoaryl ethers. For instance, there are known aromatic polyether ether ketones having a recurring unit as represented by the following formula:

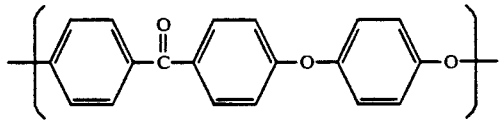

as disclosed in Japanese Patent Kokai No. 97,094/1978, and having a recurring unit as represented by the formula:

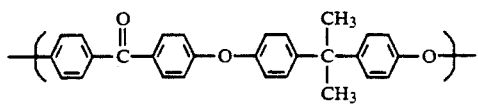

as disclosed in Japanese Patent Kokai No. 90,296/1979; aromatic polyether sulfones having a recurring unit as represented by the following formula:

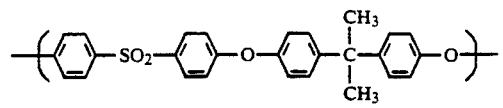

as disclosed in J. Polym. Sci. A-1, 5 (1967), p. 1373; and aromatic polycyanoaryl ethers having a recurring unit as represented by the following formula:

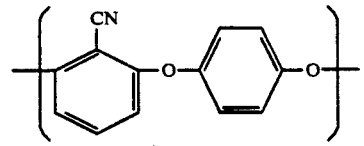

or having a recurring unit as represented by the following formula:

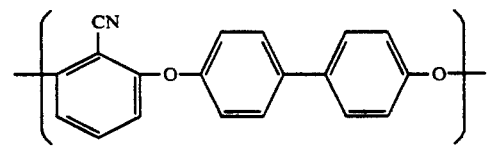

as disclosed in Japanese Patent Kokai Nos. 14,270/1972, 206,433/1984, 162,523/1986, and 223,226/1987. These aromatic polyether resins have a thermal resistance better than conventional general-purpose plastics, however, they are not sufficiently high in glass transition temperature so that they suffer from the disadvantage that they do not have a satisfactory degree of stiffness at a temperature which is higher than their glass transition temperature.

Fluorescent resin compositions are used widely as display materials, for instance, for night markers and signs as well as decorative materials. Fluorescent resin compositions as have been conventionally used are usually prepared by blending a resin with a low molecular organic fluorescent substance. In conventional technology of preparing the fluorescent resin compositions, the resin in a bulky form is crushed and pulverized during the step of preparing the resin or after it was treated with a low molecular organic fluorescent dye such as a fluorescein, Rhodamine B or the like before it is blended. The conventional fluorescent resin compositions, however, present the difficulty of preparation, requiring consumption of a large quantity of power energy, and involve the disadvantages that they cause the bleeding of the fluorescent ingredient from the resin, reducing a mechanical strength and a thermal resistance of the resin.

In order to overcome the drawbacks of the conventional fluorescent resin compositions, fluorescent polymers have been proposed which are prepared by incorporating an organic fluorescent substance such as a fluorescein, Rhodamine B, eosine Y or the like into a thermoplastic resin such as polyethylene, polypropylene, polystyrene, polyvinyl chloride or the like. One example of such fluorescent polymers is such that an esterified phenolic hydroxy group of a fluorescein is introduced into a side chain of a polyvinyl chloride resin. These conventional fluorescent polymers, however, suffer from the disadvantages that the organic fluorescent polymeric ingredient incorporated is likely to be removable from the resin and that their thermal resistance is insufficient.

In order to overcome and improve the disadvantages from which the conventional fluorescent polymers have suffered, Japanese Patent Kokai No. 62,589/1974 proposes a fluorescent polymer obtainable by incorporating a fluorescein residue into a side chain of a polymer having a polyvinyl chain as a main chain through an amide linkage. Such a fluorescent polymer, however, is obtainable through a complex series of steps and is still insufficient in a thermal resistance.

In order to overcome and improve the difficulties and disadvantages involved with the conventional fluorescent resin compositions, Japanese Patent Kokai No. 186,767/1988 discloses a fluorescent resin composition containing a europeum complex having a benzoyl trifluoroacetone moiety as a ligand. Although this resin composition is superior in durability, its fluorescence is limited to a red color so that its use is also limited to a comparatively narrow field.

SUMMARY OF THE INVENTION

Therefore, the present invention has the first object to provide an aromatic polyether which can overcome and improve the difficulties and disadvantages involved with the conventional engineering plastics and which is higher in glass transition temperature than the conventional plastics while still retaining excellent mechanical properties as well as thermal and solvent resistance inherent in plastics.

The present invention has the second object to provide fluorescent polymers and fluorescent resin compounds which can be prepared without bleeding of a fluorescent ingredient, which possesses higher degrees of mechanical strength, thermal resistance and other useful properties than the conventional fluorescent resin compounds without a loss of such useful properties as a result of blending, and, further, which generates a sufficiently strong fluorescence in varying colors.

Furthermore, the present invention has the third object to provide, in one aspect, a process for preparing the novel aromatic polyethers which can be carried out efficiently using a readily available raw material and, in another aspect, a process for preparing the fluorescent resin composition as have been described hereinabove.

In order to achieve the first object as have been described hereinabove, the present invention consists of the aromatic polyether which has a recurring unit as represented by following general formula [I]:

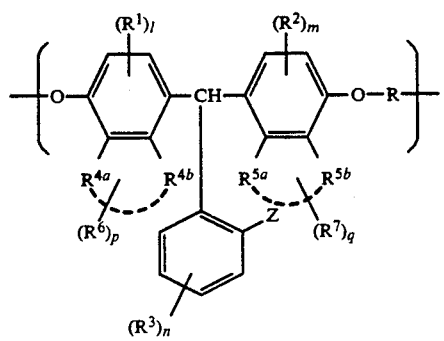

in which R stands for a formula represented by the following:

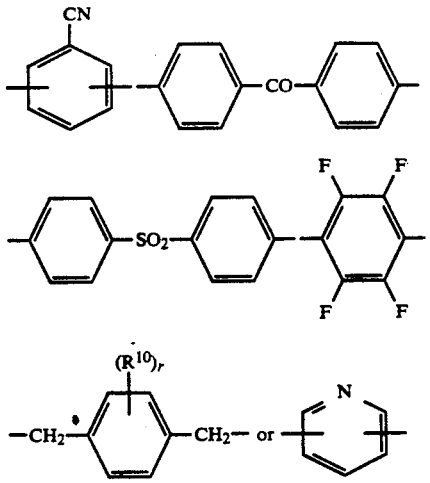

($R^{10}$ stands for a halogen atom, a lower alkyl group having from 1 to 6 carbon atoms, a lower alkoxy group having from 1 to 6 carbon atoms, an aryl group having from 6 to 8 carbon atoms or an aryloxy group having from 6 to 8 carbon atoms and r is 0 or an integer from 1 to 4);

$R^1$ and $R^2$ are identical to or different from each other and stand each for a halogen atom, a lower alkyl group having from 1 to 6 carbon atoms, a lower alkoxy group having from 1 to 6 carbon atoms, an aryl group having from 6 to 8 carbon atoms, or an aryloxy group having from 6 to 8 carbon atoms;

$R^3$ stands for a halogen atom, a carboxyl group, a lower alkyl group having 1 to 6 carbon atoms, a lower alkoxy group having 1 to 6 carbon atoms, an aryl group having 6 to 8 carbon atoms, or an aryloxy group having 6 to 8 carbon atoms;

$R^{4a}$ and $R^{4b}$ are identical to or different from each other and stand each for a hydrogen atom, $R^1$ or $R^2$ or, when taken together, for a 1,3-butadienylene group;

$R^{5a}$ and $R^{5b}$ are identical to or different from each other and stand each for a hydrogen atom, $R^1$ or $R^2$ or, when taken together, for a 1,3-butadienylene group;

$R^6$ and $R^7$ are identical to or different from each other and stand each for a halogen atom, a lower alkyl group having from 1 to 6 carbon atoms or an aryl group having from 6 to 8 carbon atoms;

Z stands for a carboxyl group, $-COOR^8$ or $-CONHR^9$ (wherein $R^8$ and $R^9$ are identical to or different from each other or stand each for a lower alkyl group having 1 to 6 carbon atoms, a lower cycloalkyl group having from 3 to 8 carbon atoms or an aryl group having 6 to 8 carbon atoms);

l and m are each 0, 1 or 2;

n is 0 or an integer from 1 to 4; and p and q is 0 or an integer from 1 to 4.

and which has a reduced viscosity of 0.1 dl/g or higher when measured in N-methylpyrrolidone in the concentration of 0.2 g/dl at 30° C.

In order to achieve the second object as have been described hereinabove, the present invention consists of a fluorescent resin composition containing the aromatic polyether represented by the general formula [I] above and a thermoplastic resin at a rate of the former in the range from 1 to 99% by weight with respect to the latter or a fluorescent resin composition comprising the aromatic polyether represented by the general formula [I] above and a europeum compound.

In order to achieve the third object in one aspect as have been described hereinabove, the present invention consists of a process for preparing the aromatic polyether represented by the general formula [I] above, which comprises reacting a phthalin compound as represented by following general formula [II]:

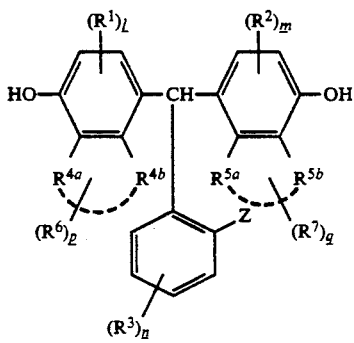

(in which $R^1$, $R^2$, $R^3$, $R^{4a}$, $R^{4b}$, $R^{5a}$, $R^{5b}$, $R^6$, $R^7$, Z, l, m, n, p, and q have the same meanings as above) or a reactive derivative thereof with a dihalogeno compound as represented by general formula [III]:

$$X^1\text{-}R\text{-}X^2 \qquad [III]$$

(in which $X^1$ and $X^2$ are identical to or different from each other and stand each for a halogen atom and R has the same meaning as above);
or reacting the aromatic polyether represented by the general formula [I] above (in which Z stands for a carboxyl group) or a reactive derivative thereof with a halide formate compound as represented by general formula [IV]:

$$R^8OCOX^3 \qquad [IV]$$

(in which $X^3$ is a halogen atom and $R^8$ has the same meaning as above)
or with an isocyanate compound as represented by general formula [V]:

$$R^9NCO \qquad [V]$$

(in which $R^9$ has the same meaning as above); and then reacting the resulting aromatic polyether represented by the general formula [I] above (in which Z is —$COOR^8$ or —$CONHR^9$) with the dihalogeno compound represented by the general formula [III] above.

In order to achieve the third object in another aspect as have been described hereinabove, the present invention consists of a process for preparing the fluorescent resin composition which comprises blending the aromatic polyether represented by the general formula [I] above with a thermoplastic resin other than the aromatic polyether represented by the general formula [I] above at the rate of the former in the range from 1 to 99% by weight with respect to the latter or which comprises blending the aromatic polyether represented by the general formula [I] above with a europeum compound.

DETAILED DESCRIPTION OF THE PREFERRED EMBODIMENTS

Figure 1:
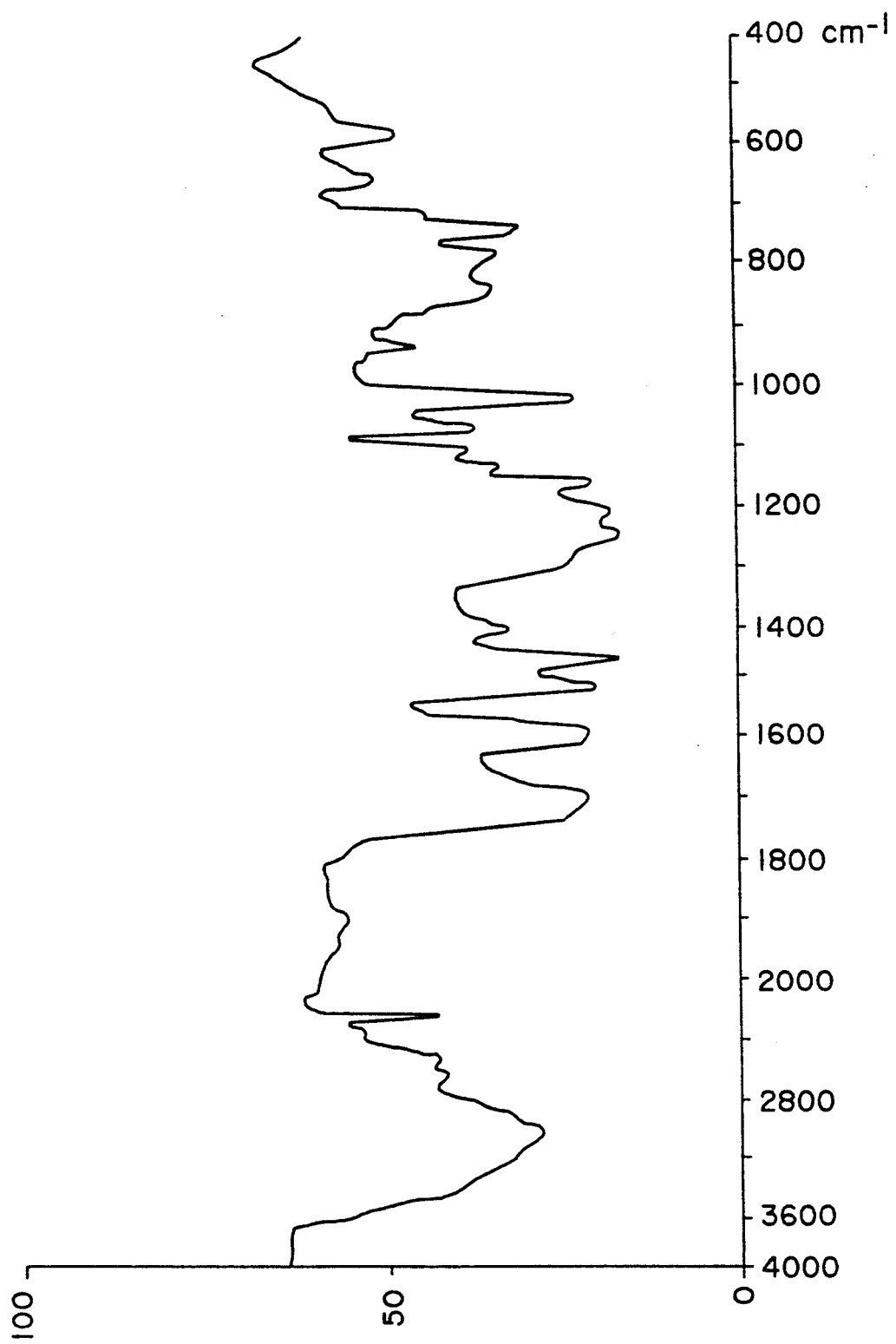
FIG. 1 is a graph showing an infrared absorption spectrum of the aromatic polyether obtained in Example 1 of the present invention.

The novel aromatic polyethers according to the present invention have a recurring unit which may be represented by the following general formula [I]:

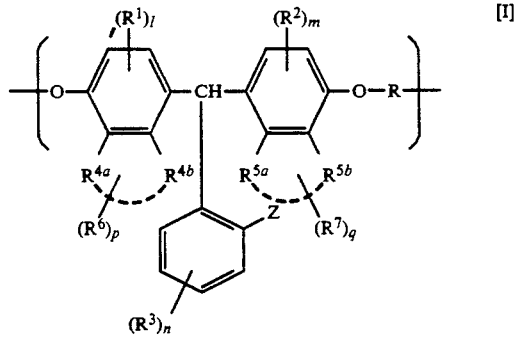

in which R stands for a formula represented by the following:

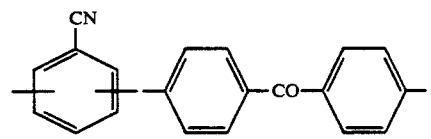

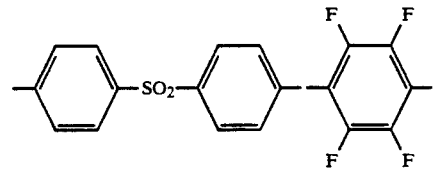

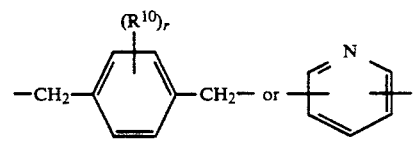

($R^{10}$ stands for a halogen atom, a lower alkyl group having from 1 to 6 carbon atoms, a lower alkoxy group having from 1 to 6 carbon atoms, an aryl group having from 6 to 8 carbon atoms or an aryloxy group having from 6 to 8 carbon atoms and r is 0 or an integer from 1 to 4);

$R^1$ and $R^2$ are identical to or different from each other and stand each for a halogen atom, a lower alkyl group having from 1 to 6 carbon atoms, a lower alkoxy group having from 1 to 6 carbon atoms, an aryl group having from 6 to 8 carbon atoms, or an aryloxy group having from 6 to 8 carbon atoms;

$R^3$ stands for a halogen atom, a carboxyl group, a lower alkyl group having 1 to 6 carbon atoms, a lower alkoxy group having 1 to 6 carbon atoms, an aryl group having 6 to 8 carbon atoms, or an aryloxy group having 6 to 8 carbon atoms;

$R^{4a}$ and $R^{4b}$ are identical to or different from each other and stand each for a hydrogen atom, $R^1$ or $R^2$ or, when taken together, for a 1,3-butadienylene group;

$R^{5a}$ and $R^{5b}$ are identical to or different from each other and stand each for a hydrogen atom, $R^1$ or $R^2$ or, when taken together, for a 1,3-butadienylene group;

$R^6$ and $R^7$ are identical to or different from each other and stand each for a halogen atom, a lower alkyl group having from 1 to 6 carbon atoms or an aryl group having from 6 to 8 carbon atoms;

Z stands for a carboxyl group, —COOR$^8$ or —CONHR$^9$ (wherein $R^8$ and $R^9$ are identical to or different from each other or stand each for a lower alkyl group having 1 to 6 carbon atoms, a lower cycloalkyl group having from 3 to 8 carbon atoms or an aryl group having 6 to 8 carbon atoms);

l and m are each 0, 1 or 2;

n is 0 or an integer from 1 to 4; and p and q is 0 or an integer from 1 to 4.

and have a reduced viscosity of 0.1 dl/g or higher when measured in N-methylpyrrolidone in the concentration of 0.2 g/dl at 30° C.

In the above general formula [I], the terms "halogen atom" referred to herein may include fluorine, chlorine, bromine and iodine.

The terms "lower alkyl group" referred to herein may stand for a straight-chained or branched-chained, monovalent saturated hydrocarbon residue having the given number of carbon atoms and may include, for example, methyl, ethyl, n-propyl, isopropyl, n-butyl, 1-methylpropyl, 2-methylpropyl, 1,1-dimethylethyl, tert-butyl, n-pentyl, 1-methylbutyl, 1-ethylpropyl, 2-methylbutyl, 3-methylbutyl, 1,1-dimethylpropyl, 1,2-dimethylpropyl, neopentyl, n-hexyl, isohexyl, sec-hexyl, tert-hexyl, and neohexyl.

The terms "lower alkoxy group" referred to herein may stand for the lower alkyl group as defined hereinabove with a hydroxy group at a given position and may include, for example, methoxy, ethoxy, n-propoxy, isopropoxy, n-butoxy, 1-methylpropoxy, 2-methylpropoxy, tert-butoxy, n-pentyloxy, 1-methylbutoxy, 1-ethylpropoxy, 2-methylbutoxy, 3-methylbutoxy, 1,1-dimethylpropoxy, 1,2-dimethylpropoxy, n-hexyloxy, 1-methylpentyloxy, 1-ethylbutoxy, 2-methylpentyloxy, 4-methylpentyloxy, 1,1-dimethylbutoxy, 1,3-dimethylbutoxy, 1-ethyl-2-methylpropoxy, 3-methylpentyloxy, 1,2-dimethylbutoxy, 2-ethylbutoxy, 1-methyl-1-ethylpropoxy, 2,2-dimethybutoxy, and 3,3-dimethylbutoxy.

The terms "aryl group" referred to herein may stand for a monovalent aromatic hydrocarbon residue having the given carbon atoms and may include, for example, phenyl, 2-methylphenyl, 3-methylphenyl, 4-methylphenyl, 2,3-dimethylphenyl, 2,4-dimethylphenyl, 2,5-dimethylphenyl, 2,6-dimethylphenyl, 3,4-dimethylphenyl, 3,5-dimethylphenyl, 2-ethylphenyl, 3-ethylphenyl and 4-ethylphenyl.

The terms "aryloxy group" referred to herein may stand for the aryl group as defined hereinabove with a hydroxy group attached thereto at a given position as well as with and/or without a substituent attached thereto and may include, for example, phenoxy, 2-methylphenoxy, 3-methylphenoxy, 4-methylphenoxy, 2,3-dimethylphenoxy, 2,4-dimethylphenoxy, 2,5-dimethylphenoxy, 2,6-dimethylphenoxy, 3,4-dimethylphenoxy, 3,5-dimethylphenoxy, 2-ethylphenoxy, 3-ethylphenoxy and 4-ethylphenoxy.

In accordance with the present invention, the preferred groups referred to as $R^1$, $R^2$, and $R^3$ in the general formulas [I] and [II] may include, for example, hydrogen atom, methyl, isopropyl, and phenoxy groups.

In accordance with the present invention, the aromatic polyether represented by the general formula [I] above may be prepared by reacting the phthalin compound as represented by following general formula [II]:

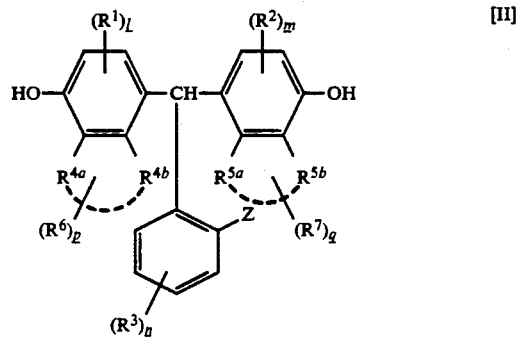

(in which $R^1$, $R^2$, $R^3$, $R^{4a}$, $R^{4b}$, $R^{5a}$, $R^{5b}$, $R^6$, $R^7$, Z, l, m, n, p, and q have the same meanings as above)

or a reactive derivative thereof with the dihalogeno compound as represented by general formula [III]:

$X^1$-R-$X^2$      [III]

(in which $X^1$ and $X^2$ are identical to or different from each other and stand each for a halogen atom and R has the same meaning as above);

or reacting the aromatic polyether represented by the general formula [I] above (in which Z stands for a carboxyl group) or a reactive derivative thereof with the halide formate compound as represented by general formula [IV]:

$R^8OCOX^3$      [IV]

(in which $X^3$ is a halogen atom and $R^8$ has the same meaning as above)

or with the isocyanate compound as represented by general formula [V]:

$R^9NCO$      [V]

(in which $R^9$ has the same meaning as above); and then reacting the resulting aromatic polyether represented by the general formula [I] above (in which Z is —COOR$^8$ or —CONHR$^9$) with the dihalogeno compound represented by the general formula [III] above.

The phthalin compound represented by the general formula [II] may generally include, for example, a phenolphthalin compound as represented by following general formula [IIa]:

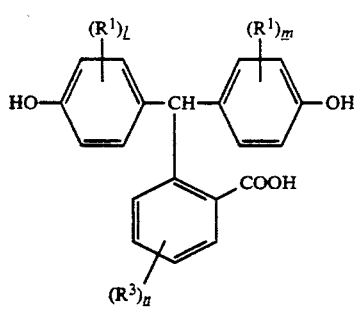

(in which $R^1$, $R^2$, $R^3$, l, m, and n have the same meanings as above)
or a naptholphthalin compound as represented by following general formula [IIb]:

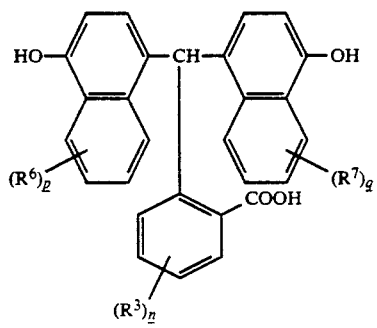

(in which $R^1$, $R^2$, $R^3$, $R^6$, $R^7$, l, m, and n have the same meanings as above)
or a reactive derivative thereof.

The phenolphthalin compound represented by the general formula [IIa] may specifically include, for example, phenolphthalin as represented by formula:

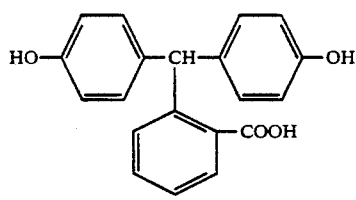

thymolphthalin as represented by formula:

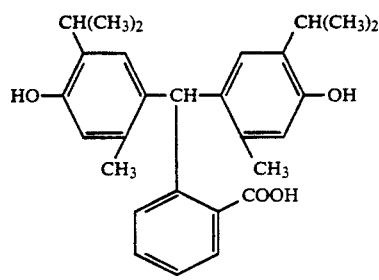

cresolphthalin as represented by formula:

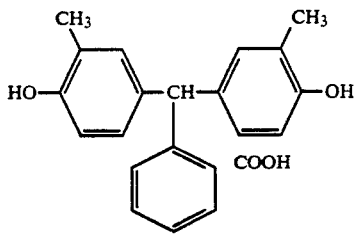

and other derivatives as represented by formulas:

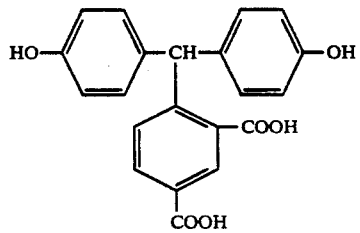

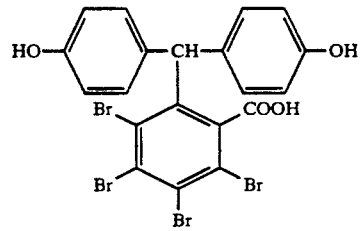

The reactive derivatives of the phthalin compounds represented by the general formula [II] may be of such a type that a hydroxy group thereof is converted to a reactive form such as an alkali metal salt by reaction with an alkali metal compound. Phenolphthalin is preferred, and a mixture of plural phthalin compounds may also be used.

As a copolymeric component, a dihydroxy aromatic compound as represented by following general formula [VI]:

HO-AR-OH  [VI]

(in which AR stands for an aryl group) may be used in an appropriate amount within the range in which the copolymeric component exerts no adverse effect on the objects of the present invention, together with the phthalin compound represented by the general formula [II] above and/or its reactive derivative.

The aryl group referred to as reference symbol AR in the general formula [VI] above may include, for example, formulas as represented by the following:

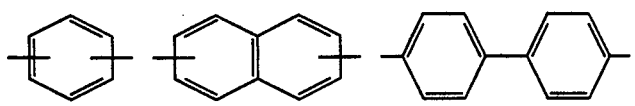
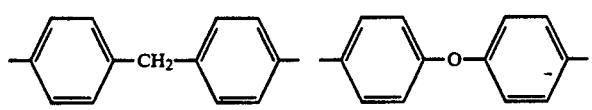
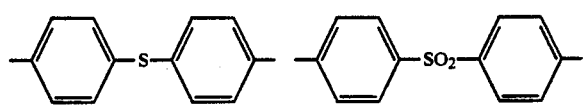
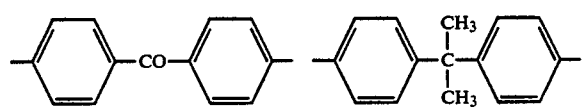
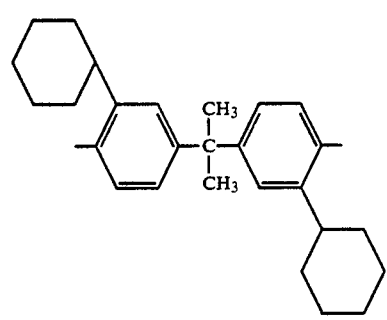
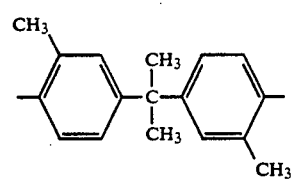
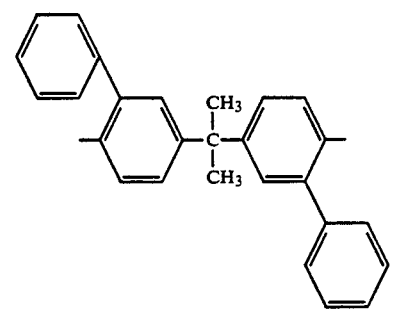
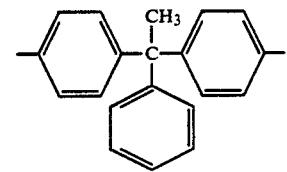

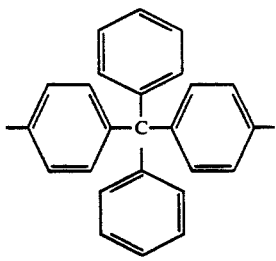

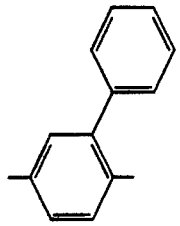

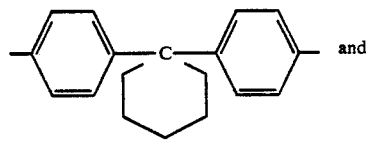 and

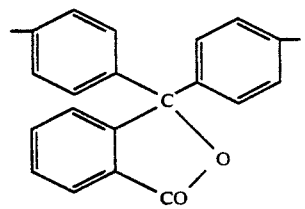

Specifically, the dihydroxy aromatic compounds represented by the general formula [VI] above may include, for example, a hydroquinone such as hydroquinone, chlorohydroquinone, methylhydroquinone, acetylhydroquinone and acetoxyhydroquinone, a dihydroxynaphthalene such as 1,4-dihydroxynaphthalene, 1,5-dihydroxynaphthalene, 1,6-dihydroxynaphthalene, 2,6-dihydroxynaphthalene and 2,7-dihydroxynaphthalene, a bis(hydroxyphenyl)alkane such as bis(4-hydroxyphenyl)methane, bis(4-hydroxy-3,5-dichlorophenyl)methane, bis(4-hydroxy-3,5-dibromophenyl)methane, 2,2-bis(4-hydroxyphenyl)propane, 2,2-bis(4-hydroxy-3-chlorophenyl)propane, 2,2-bis(4-hydroxy-3-methylphenyl)propane, 2,2-bis(4-hydroxy-3,5-dichlorophenyl)propane and 2,2-bis(4-hydroxy-3,5-dimethylphenyl)propane, a bis(hydroxyphenyl)cycloalkane such as 1,1-bis(4-hydroxyphenyl)cyclohexane, a dihydroxydiphenyl such as 4,4'-dihydroxydiphenyl, a bis(hydroxyphenyl)ketone such as bis(4-hydroxyphenyl)ketone, bis(4-hydroxy-3,5-dichlorophenyl)ketone and bis(4-hydroxy-3,5-dimethylphenyl)ketone, a bis(hydroxyphenyl)sulfide such as bis(4-hydroxyphenyl)sulfide, bis(4-hydroxy-3-chlorophenyl)sulfide and bis(4-hydroxy-3,5-dichlorophenyl)sulfide, a bis(hydroxyphenyl)ether such as bis(4-hydroxyphenyl)ether, bis(4-hydroxy-3-chlorophenyl)ether and bis(4-hydroxy-3,5-dichlorophenyl)ether, a bis(hydroxyphenyl)sulfone such as bis(4-hydroxyphenyl)sulfone, bis(4-hydroxy-3-chlorophenyl)sulfone and bis(4-hydroxy-3,5-dichlorophenyl)sulfone, and a bis(hydroxyphenyl)-bis(phenyl)alkane such as 1,1-bis(4-hydroxyphenyl)-1,1-bis(phenyl)methane.

The dihydroxy aromatic compound as represented by the general formula [VI] above may also be used in a reactive derivative form such as an alkali metal salt or the like. The dihydroxy aromatic compound may be used singly or in admixture with the other dihydroxy aromatic compound or compounds. An amount of the dihydroxy aromatic compound may be preferably below 99 mole % or lower with respect to the total diol ingredients. The dihydroxy aromatic compound represented by the general formula [VI] above may be used in a molar ratio of the dihydroxy aromatic compound to the phthalin compound represented by the general formula [II] above in the range from 1 to 99 to 99 to 1, preferably from 10 to 90 to 90 to 10.

The dihalogeno compound as represented by the general formula [III] above may be enumerated by a dihalogeno benzonitrile as represented by following general formula [IIIA]:

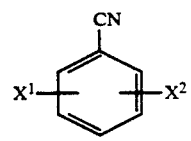 [IIIA]

(in which $X^1$ and $X^2$ have the same meanings as above); a dihalogeno benzophenone as represented by following general formula [IIIB]:

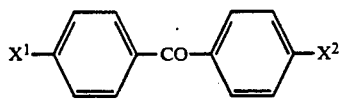

[IIIB]

(in which $X^1$ and $X^2$ have the same meanings as above); a dihalogeno diphenyl sulfone as represented by general formula [IIIC]:

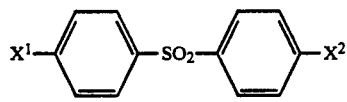

[IIIC]

(in which $X^1$ and $X^2$ have the same meanings as above); a xylylene dihalide as represented by following general formula [IIID]:

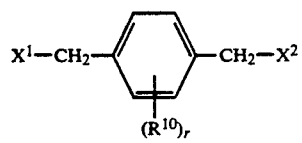

[IIID]

(in which $X^1$ and $X^2$ have the same meanings as above); hexafluorobenzene represented by following formula [IIIE]:

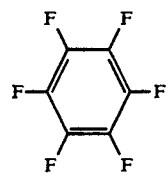

or a dihalogeno pyridine as represented by following general formula [IIIF]:

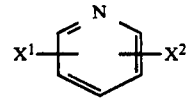

(in which $X^1$ and $X^2$ have the same meanings as above).

The dihalogeno benzonitriles represented by the general formula [IIIA] above may include, for example, 2,4-dichlorobenzonitrile, 2,6-dichlorobenzonitrile, 2,4-difluorobenzonitrile, 2,6-difluorobenzonitrile, 2-fluoro-6-chlorobenzonitrile, and 2-chloro-6-fluorobenzonitrile. 2,6-Dichlorobenzonitrile and 2,6-difluorobenzonitrile are preferred.

The dihalogeno benzophenones represented by the general formula [IIIB] above may include, for example, 4,4'-difluorobenzophenone, 4,4'-dichlorobenzophenone, and 4-chloro-4'-fluorobenzophenone. Preferred are 4,4'-dichlorobenzophenone and 4,4'-difluorobenzophenone.

The dihalogeno diphenyl sulfones represented by the general formula [IIIC] above may include, for example, 4,4'-dichlorodiphenyl sulfone, 4,4'-difluorodiphenyl sulfone, and 4-chloro-4'-fluorodiphenyl sulfone. 4,4'-Dichlorodiphenyl sulfone and 4,4'-difluorodiphenyl sulfone are preferred.

The xylylene dihalides represented by the general formula [IIID] above may include, for example, a xylylene dichloride, a xylylene dibromide, a xylylene diiodide, and such substituted by an alkyl group or a halogen atom. Preferred are m-xylylene dichloride, p-xylylene dichloride, m-xylylene dibromide, and p-xylylene dibromide.

The dihalogeno pyridines represented by the general formula [IIIF] above may be preferably ones in which $X^1$ and $X^2$ are each chlorine or fluorine atom and may include, for example, 2,4-dichloropyridine, 2,6-dichloropyridine, 2,4-difluoropyridine, 2,6-difluoropyridine, 2-fluoro-4-chloropyridine and 2-fluoro-6-chloropyridine.

The dihalogeno compound may be used singly or in admixture with the other dihalogeno compound or compounds.

The dihalogeno compounds represented by the general formula [III] above may be used at a molar ratio in the range usually from 0.98 to 1.02, preferably from 1.00 to 1.01, with respect to the total amount of the phthalin compounds represented by the general formula [II] above and the dihydroxy aromatic compound used as needed. If the dihalogeno compounds are used outside the given range in the molar ratio, a conversion rate of either of the ingredients may be reduced.

In accordance with the present invention, the phthalin compound represented by the general formula [II] above may be reacted with the dihalogeno compound represented by the general formula [III] above usually in a solvent in the presence of an alkali metal compound.

The alkali metal compound to be used may include, for example, an alkali metal hydroxide such as sodium hydroxide and potassium hydroxide, an alkali metal carbonate such as sodium carbonate, potassium carbonate, and potassium sodium carbonate, and an alkali metal hydrogen carbonate such as sodium hydrogen carbonate and potassium hydrogen carbonate. Among them, the alkali metal carbonate and the alkali metal hydrogen carbonate are preferred, and sodium carbonate and potassium carbonate are particularly preferred. The allali metal compound may be used preferably in a form of an anhydride and, as needed, in a form of a hydrate or a concentrated aqueous solution. It is preferred that water added in the reaction system and water produced during the reaction are conveniently removed from the reaction system during or prior to the condensation polymerization. The alkali metal compound may be used singly or in admixture with the other alkali metal compound or compounds.

The alkali metal compound may be used in an amount of the alkali metal atom ranging usually from 0.3 to 2.5 gram atoms, preferably from 0.5 to 2.0 gram atoms, with respect to one third mole of the phthalin compound represented by the general formula [II] above and with respect to a half mole of the dihydroxy aromatic compound to be used as desired. If the amount of the alkali metal compound is less than 0.3 gram atoms, a reaction velocity is slowed down, thus producing aromatic polyethers with lesser molecular weights. If the alkali metal compound is used in the amount beyond the upper limit, the reaction may occur violently causing an undesirable side reaction.

The solvent to be used for the reaction may be preferably a neutral polar solvent which may include, for example, a sulfoxide such as dimethyl sulfoxide (DMSO) and diethyl sulfoxide, a sulforan such as sulforan, 1-methyl-1-oxosulforan, 1-ethyl-1-oxosulforan and 1-phenyl-1-oxosulforan, a sulfone such as diphenylsulfone, a formamide such as N,N-dimethylformamide (DMF) and N,N-diethylformamide, an acetamide such as N,N-dimethylacetamide (DMAc), N,N-diethylacetamide and N,N-dipropylacetamide, an amide such as N,N-dimethylbenzoic acid amide, a pyrrolidone such as N-methyl-2-pyrrolidone (NMP), N-ethyl-2-pyrrolidone, N-n-propyl-2-pyrrolidone, N-isopropyl-2-pyrrolidone, N-n-butyl-2-pyrrolidone, N-isobutyl-2-pyrrolidone, N-methyl-3-methyl-2-pyrrolidone, N-ethyl-3-methyl-2-pyrrolidone and N-methyl-3,4,5-trimethyl-2-pyrrolidone, a piperidone such as N-methyl-2-piperidone, N-ethyl-2-piperidone, N-isopropyl-2-piperidone, N-methyl-6-methyl-2-piperidone, N-methyl-3-ethyl-2-piperidone, and an imidazolidinone such as dimethyl imidazolidinone (DMI). Particularly preferred are N-methyl-2-pyrrolidone and so on. The neutral polar solvent may be used singly or in admixture with the other netural polar solvent or solvents or with other inert solvent, particularly an aromatic solvent capable of azeotropically distillating water from the reaction system, such as toluene, xylene, chlorobenzene or anisole.

The amount of the neutral polar solvent to be used is not restricted to any particular range and may range usually from 10 to 1,000 parts by weight with respect to the total weight of the monomers to be used.

The reaction temperature for the polymerization may range usually from 150° C. to 350° C., preferably from 180° C. to 250° C. If the reaction is carried out at a temperature which is lower than 150° C., it is not practical because the reaction velocity becomes too slow. If the reaction is carried out beyond 350° C., there is the tendency that a color of the polymer produced turns darker due to aging. In order to provide a favorable polymer in a gel-less and colorless state, it is desirable to elevate the reaction temperature slowly during the polymerization and retain the polymerization system at a uniform temperature. The reaction time may vary with the reaction temperature, the kind of raw material to be used as a monomer, as well as the kind and the amount of the alkali metal compound, and may range usually from 0.5 to 10 hours, preferably from 1 to 5 hours.

More specifically, the polymerization may be carried out by adding given amounts of the phthalin compound represented by the general formula [II] above and/or a reactive derivative thereof, the dihalogeno compound represented by the general formula [III] above, and the alkali metal compound to the neutral polar solvent and heating the mixture at a temperature ranging usually from 150° C. to 350° C. The order of adding each of the reaction components such as the reaction reagents and solvents is not restricted to a particular one and all the components may be mixed all together simultaneously or stepwise.

The polymerization may be carried out preferably at an inert ambient atmosphere in which an inert gas such as nitrogen, argon, helium or the like is present and in which such an inert gas is flown. Reaction pressures are not restricted to a particular range and may be preferably around normal pressure.

It is preferred to remove water produced during the polymerization from the reaction system, and a method for removal of the water is not limited to a particular one. For example, a method involving a gas substitution in a reactor, a gas flow, an additon of a solution distillable azeotropically with water and so on may be used.

The polymerization may terminate at an appropriate point of time by adding a polymerization terminator such as an active halogen compound to the polymerizing solution and maintaining the reaction mixture usually at a temperature which is substantially the same as the temperature during the polymerization. This enables the phenolic terminal to be converted, thus stabilizing the resulting polymer.

The aromatic polyethers having the recurring unit as represented by the general formula [I] above may be separated from the reaction mixture and purified to provide a product with a higher purity in conventional purification method such as distillation of solvents, precipitation and filtration of solid materials, or washing with water, an acid or an alcohol such as methanol. The polymer is further purified with reprecipitation, if necessary.

As have been described hereinabove, the aromatic polyethers according to the present invention should have a reduced viscosity [η sp/c] of 0.1 dl/g or higher when measured in an N-methylpyrrolidone solution in the concentration of 0.2 g/dl at 30° C. Aromatic polymers with a reduced viscosity outside the range do not demonstrate desired characteristics.

The fluorescent resin compositions according to the present invention comprise the aromatic polyethers having the recurring unit as represented by the general formula [I] above and a thermoplastic resin other than the aromatic polyethers, in which the aromatic polyethers may be used in an amount ranging from 1 to 99% by weight with respect to the total weight of the resins or comprise the aromatic polyethers having the recurring unit as represented by the general formula [I] above and a europeum compound. Other ingredients may be added, as desired, which may include an additive such as, for example, a plasticizer, an antioxidant or the like, any other fluorescent ingredient such as an organic fluorescent substance other than the europeum compound, any other resin composition, and/or any other polymer.

The thermoplastic resin to be used as a component for the fluorescent resin compositions according to the present invention may include any resin conventionally used and specifically include, for example, a polycarbonate, a polystyrene, a polyethylene, a polypropylene, a poly[methyl methacrylate], a polysulfone, a polyether sulfone, a polyether imide, a poly[ether ether ketone], a poly[cyanoaryl ether], a poly[ethylene terephthalate], poly[butylene terephthalate], an aromatic polyester, a polyamide, a poly[vinyl chloride] and the like. The thermoplastic resin may be used singly or in combination with the other resin.

The fluorescent resin compositions according to the present invention are such that the aromatic polyethers having the recurring unit as represented by the general formula [I] are used in the amount ranging from 1% to 99% by weight, preferably from 5% to 50% by weight, with respect to the total weight of the aromatic polyether and the thermoplastic resin. If the amount of the polyether is less than the lower limit, on the one hand, the resin composition cannot produce a desired degree of fluorescence and, if the amount of the polyether is larger than the upper limit, on the other hand, the resin composition cannot attain a desired mechanical strength and/or thermal resistance.

The resin compositions according to the present invention may be prepared by blending the aromatic polyethers with the thermoplastic resin and, as needed, any other components in any conventional means such as, for example, melt blend method or solution blend method. Temperatures at which the resinous compositions are admixed or melt blended may range usually from 150° C. to 400° C., preferably from 250° C. to 350° C. If the components would be blended at a too low temperature, the blending requires a long blending time and the blending cannot be effected in a uniform manner, on the one hand, and, if the temperature at which the components are blended would be too high, the components may be decomposed, on the other hand. Blending time may range usually from 1 to 10 minutes, preferably from 2 to 5 minutes.

The aromatic polyether as one component of the fluorescent resin composition may be an aromatic polyether consisting of a homopolymer [HP-1] having only one kind of the recurring units as represented by the general formula [I], an aromatic polyether consisting of a copolymer [CP-1] having two kinds or more of the recurring units, and an admixture thereof. As the polymeric component constituting the homopolymer [HP-I] and/or the copolymer [CP-I], there may be preferably enumerated the dihalogeno benzonitrile as represented by the general formula [IIIA] and/or the dihalogeno diphenyl sulfone as represented by the general formula [IIIC].

As the aromatic polyether to be used as a component of the resin composition according to the present invention, a copolymer [CP-2] having at least one kind of the recurring units as represented by the general formula [I] and another recurring unit (U-1) or a mixture thereof may also be used in an amount which is not detrimental to the objects of the present invention. The copolymer [CP-2] may be used in admixture with one or more of the homopolymers [HP-1] and/or the copolymers [CP-1].

Such a recurring unit (U-1) may be appropriately chosen from a recurring unit as represented by following formula:

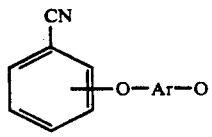

[U-1a]

in which Ar is:

$R^{12a}$ and $R^{12b}$ are identical to and different from each other and stand each for a hydrogen atom, a lower alkyl group having from 1 to 4 carbon atoms or a phenyl group)

and a recurring unit as represented by following formula:

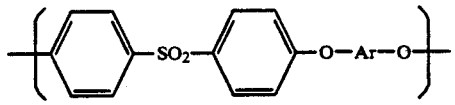

(in which Ar has the same meaning as above).

The polyether components to be used for the resin composition according to the present invention have a reduced viscosity [ηsp/c] of 0.1 dl/g or higher, preferably ranging from 0.3 to 1.0 dl/g, when measured in an N-methylpyrrolidone (0.2 g/dl) at 30° C. If the reduced viscosity is lower than the lower limit, the resin composition reduces its mechanical strength and thermal resistance.

In another aspect, the fluorescent resin compositions according to the present invention comprises the aromatic polyether having the recurring unit as represented by the general formula [I] and a europeum compound. The europeum compound is not restricted to a particular compound and may be any one which may include, for example, europeum oxide, europeum hydroxide, europeum carbonate, europeum oxalate, europeum chloride, europeum fluoride, europeum bromide, europeum nitrate, europeum sulfate, europeum acetate, europeum pyrohydrochloride, europeum phosphate, metal europeum, tris(dimethyl-octanedionate)europeum, tris(dipivaromethanate)europeum, tris[(tert-butylhydroxymethylene)camphorate]europeum, and the like.

The amount of the europeum compound to be used may be in the range from 0.001 to 10 parts by weight, preferably from 1.0 to 5.0 parts by weight, with respect to the weight of the aromatic polyether. If the amount of the europeum compound is too small, the resulting resin composition does not produce a sufficient degree of fluorescence. If the amount of the europeum compound is too much, the effect cannot be attained in proportion to an increase in the amount thereof and a

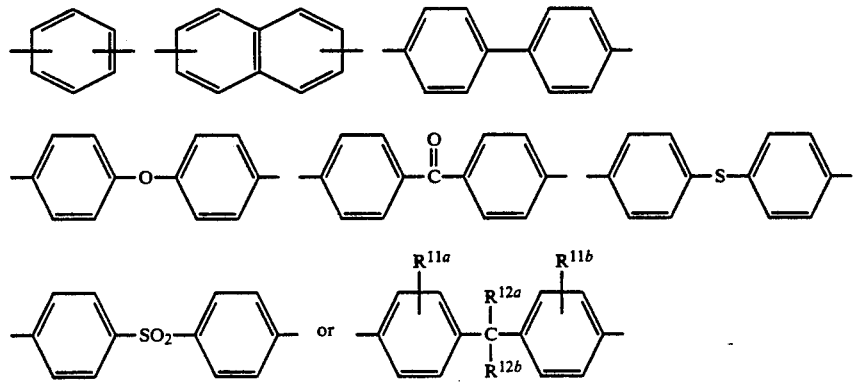

(wherein
$R^{11a}$ and $R^{11b}$ are identical to and different from each other and stand each for a hydrogen atom, a lower alkyl group having from 1 to 4 carbon atoms or a phenyl group, and decrease in a thermal resistance may be caused.

The fluorescent resin composition according to the present invention may produce fluorescence in plural colors in accordance with excited wavelengths, for example, in a red color when irradiated at excited wavelengths of 240 nm to 320 nm and in a blue color when irradiated at excited wavelengths of 330 nm to 420 nm.

Furthermore, the fluorescent resin compositions according to the present invention may be prepared by a simple method which, in turn, does not require a large quantity of power energy during blending and cause any bleeding and any decrease in mechanical strength, thermal resistance and other properties. They are superior in mechanical strength and thermal resistance to conventional resin compositions and generate a higher degree of fluorescence than the conventional ones. They are very useful as a fluorescent material for display articles for advertisement, decoration and the like, printing ink materials, toy molding materials, and so on.

The present invention will be described more in detail by way of examples. It is to be understood that the present invention should be interpreted to contain modifications and variations without departing from the spirit of the invention.

EXAMPLE 1

Into a 300-ml separable flask equipped with a stirrer, an argon gas blowing tube, a thermocouple and a Dean & Stark trap filled with toluene, 25.371 grams (0.08 moles) of phenolphthalin (0.08 moles), 13.761 grams (0.08 moles) of 2,6-dichlorobenzonitrile, 17.414 grams (0.126 moles) of potassium carbonate, and 100 ml of N-methylpyrrolidone were placed, and the temperature of the mixture was elevated from room temperature to 195° C. over the period of 45 minutes while argon gas was blown thereinto with stirring. Then about 3 ml of toluene was added to the reaction system and water produced was removed over the period of 90 minutes by reflux of the toluene. After removal of the toluene, the reaction mixture was maintained at that temperature for 2 hours with stirring.

The reaction mixture was then allowed to cool and the product was precipitated in water. The product was then crushed with a blender (manufactured by Warning, Inc.) and washed three times with 1 liter of water and once with 1 liter of methanol, yielding 32.6 grams of a polymer in powdery form with a yield of 98%.

The polymer has been found to have a reduced viscosity of 0.64 dl/gram in N-methylpyrrolidone (0.2 grams/dl) at 30° C., a glass transition temperature of 229° C., and a thermal decomposition temperature of 435° C. (in air, weight loss of 5%). Its infrared absorption spectrum is shown in FIG. 1. As shown in FIG. 1, absorption bands were recognized at 2250 cm$^{-1}$ on the basis of the nitrile group and at 1240 cm$^{-1}$ on the basis of the ether linkage. The polymer has been confirmed to be an aromatic polyether with a recurring unit as shown hereinbelow:

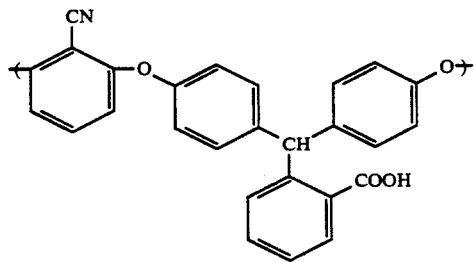

The polymer was pressed at 320° C. to form a film which has produced a strong fluorescence with the wavelength of 470 to 500 nm in a blue-green color, when irradiated with ultraviolet rays at the wavelength of 320 nm.

EXAMPLE 2

The procedures of Example 1 were followed in substantially the same manner with the exception that, in place of 2,6-dichlorobenzonitrile, 17.63 grams (0.08 moles) of 4,4'-difluorobenzophenone was used, yielding 39.0 grams of polymer (yield: 98%).

The polymer has been found to have a reduced viscosity of 0.56 dl/gram in N-methylpyrrolidone (0.2 grams/dl) at 30° C., a glass transition temperature of 214° C., and a thermal decomposition temperature of 421° C. The infrared absorption spectrum of the resulting polymer indicated absorption peaks at 1,240 cm$^{-1}$ on the basis of the ether linkage and at 1,650 cm$^{-1}$ on the basis of the carbonyl group.

The resulting polymer was confirmed to be an aromatic polyether having a recurring unit as represented by the following formula:

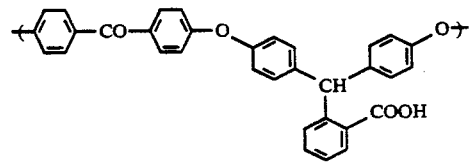

EXAMPLE 3

The procedures of Example 1 were followed in substantially the same manner with the exception that, in place of 2,6-dichlorobenzonitrile, 20.34 grams (0.08 moles) of 4,4'-difluorodiphenyl sulfone was used, yielding 41.2 grams of a polymer (yield: 97%).

The polymer has been found to have a reduced viscosity of 0.89 dl/gram in N-methylpyrrolidone (0.2 grams/dl) at 30° C., a glass transition temperature of 234° C., and a thermal decomposition temperature of 435° C.

The infrared absorption spectrum of the resulting polymer indicated absorption peaks at 1,240 cm$^{-1}$ on the basis of the ether linkage and at 1,230 cm$^{-1}$ on the basis of the sulfonyl group.

The resulting polymer was confirmed to be an aromatic polyether having a recurring unit as represented by the following formula:

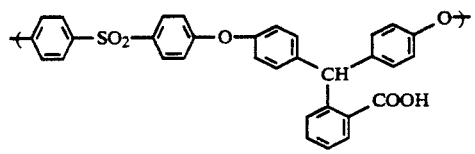

It was found that the resulting polymer was pressed at 320° C. to form a film which generates a strong fluorescence in a blue-green color when irradiated with ultraviolet rays.

EXAMPLE 4

The procedures of Example 1 were followed in substantially the same manner with the exception that 20.34 grams (0.08 moles) of 4,4'-difluorodiphenyl sulfone, 12.685 grams (0.04 moles) of phenolphthalin, 12.606 grams (0.04 moles) of phenolphthalein, 17.414 grams (0.132 moles) of potassium carbonate, and 100 ml of N-methylpyrrolidone were used, yielding 41.6 grams of a polymer (yield: 98%).

The polymer has been found to have a reduced viscosity of 1.18 dl/gram in N-methylpyrrolidone (0.2 grams/dl) at 30° C., a glass transition temperature of 255° C., and a thermal decomposition temperature of 445° C.

The infrared absorption spectrum of the resulting polymer was the same as that obtained in Example 3. And it was confirmed to be an aromatic polyether having a recurring unit as represented by the following formula:

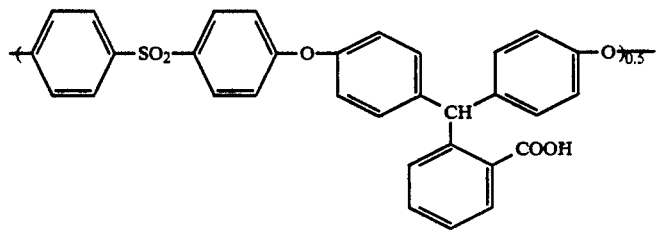

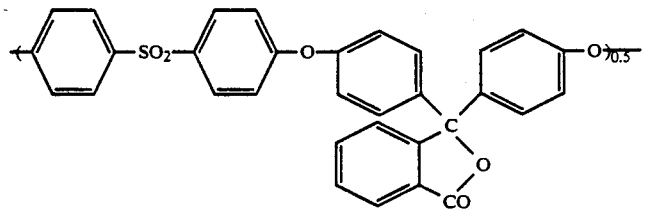

It was further found that the polymer was pressed at 320° C. to form a film which generates a strong fluorescence in a blue-green color at 470 nm when irradiated with ultraviolet rays having the wavelength of 320 nm.

EXAMPLE 5

In substantially the same manner as in Example 1, 11.128 grams (0.08 moles) of 2,6-difulorobenzonitrile, 34.257 grams (0.08 moles) of thymolphthalin, 18.243 grams (0.132 moles) of potassium carbonate, and 100 ml of N-methylpyrrolidone were placed in a separable flask equipped in the same manner as used in Example 1, and the mixture was heated from room temperature to 195° C. over the period of 45 minutes while argon gas was flown into the flask with stirring. To the reaction system was added about 3 ml of toluene, and the reaction was carried out under reflux of toluene for 60 minutes.

After completion of the reaction, the reaction mixture was cooled and the product was allowed to precipitate in water. The precipitated product was crushed with a blender and washed three times with 1 liter of water and then once with 1 liter of methanol, yielding 41.3 grams of a powdery polymer (yield: 98%).

The resulting polymer has been found to have a reduced viscosity of 0.89 dl/gram in N-methylpyrrolidone (0.2 grams/dl) at 30° C., a glass transition temperature of 231° C., and a thermal decomposition temperature of 385° C.

The infrared absorption spectrum of the resulting polymer indicated absorption peaks at 2,250 cm$^{-1}$ on the basis of the nitrile group and at 1,240 cm$^{-1}$ on the basis of the ether linkage. And it was confirmed to be an aromatic polyether having a recurring unit as represented by the following formula:

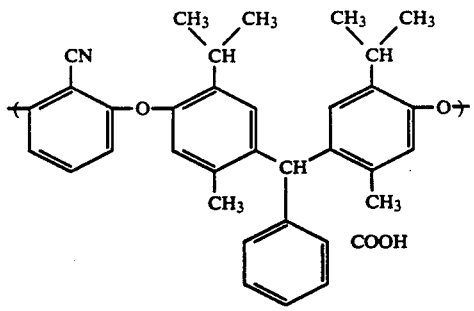

It was further found that the resulting polymer was pressed at 310° C. to form a film which generates a strong fluorescence in a blue color at 450 nm to 460 nm, when irradiated with ultraviolet rays having the wavelength of 320 nm.

EXAMPLE 6

The procedures of Example 5 were followed in substantially the same manner with the exception that, in place of 2,6-difluorobenzonitrile, 20.34 grams (0.08 moles) of 4,4'-difluorodiphenyl sulfone was used, yielding 50.4 grams of a polymer (yield: 97%). The polymer has been found to have a reduced viscosity of 0.25 dl/gram in N-methylpyrrolidone (0.2 grams/dl) at 20° C., a glass transition temperature of 242° C., and a thermal decomposition temperature of 390° C.

The infrared absorption spectrum of the resulting polymer indicated the same absorption peaks as that obtained in Example 3.

The resulting polymer was confirmed to be an aromatic polyether having a recurring unit as represented by the following formula:

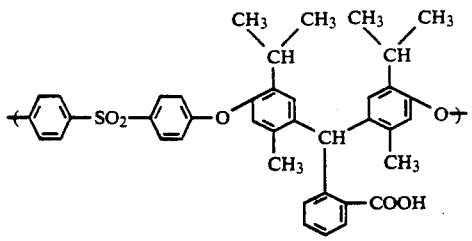

It was further found that the resulting polymer was pressed at 320° C. to form a film which generates a strong fluorescence in a blue color at 450 nm to 460 nm, when irradiated with ultraviolet rays having the wavelength of 320 nm.

EXAMPLE 7

Into a 300-ml separable flask equipped with a stirrer, a tube for blowing argon gas, a thermocouple and a Dean & Stark trap filled with toluene, 33.64 grams (0.08 moles) of 1-naphtholphthalin, 20.54 grams (0.08 moles) of 4,4'-difluorodiphenyl sulfone, 19.9 grams (0.144 moles) of potassium carbonate, and 150 ml of N-methylpyrrolidone were placed, and the temperature of the mixture was elevated from room temperature to 195° C. over the period of 45 minutes while argon gas was blown thereinto with stirring. Then about 3 ml of toluene was added to the reaction system and water produced was removed over the period of 90 minutes by reflux of the toluene. After removal of the toluene, the reaction mixture was maintained at that temperature for 2 hours with stirring. The reaction mixture was then allowed to cool and the product was precipitated in water. The product was then crushed with a blender (manufactured by Warning, Inc.) and washed three times with 1 liter of water and once with 1 liter of methanol, yielding 48.4 grams of a polymer in powdery form with a yield of 95%.

The polymer has been found to have a reduced viscosity of 0.48 dl/gram in N-methylpyrrolidone (0.2 grams/dl) at 30° C., a glass transition temperature of 259° C., and a thermal decomposition temperature of 401° C. (in air, weight loss of 5%). Its infrared absorption spectrum indicates absorption peaks at 1,240 cm$^{-1}$ on the basis of the ether linkage.

The polymer has been confirmed to be an aromatic polyether with a recurring unit as represented by the following formula:

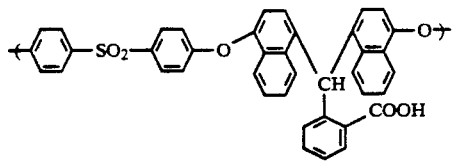

It was further found that the resulting polymer generates a strong fluorescence in a blue color at 475 nm, when irradiated with ultraviolet rays having the wavelength of 320 nm to 420 nm.

EXAMPLE 8

The procedures of Example 7 were followed in substantially the same manner with the exception that, in place of 4,4'-difluorodiphenyl sulfone, 11.239 grams (0.08 moles) of 2,6-difluorobenzonitrile was used, yielding 40.0 grams of a polymer (yield: 96%).

The polymer has been found to have a reduced viscosity of 0.39 dl/gram in N-methylpyrrolidone (0.2 grams/dl) at 30° C., a glass transition temperature of 246° C., and a thermal decomposition temperature of 390° C. (in air, a weight loss of 5%).

The infrared absorption spectrum of the resulting polymer indicated absorption peaks at 1,240 cm$^{-1}$ on the basis of the ether linkage and at 2,250 cm$^{-1}$ on the basis of the nitrile group.

The resulting polymer was confirmed to be an aromatic polyether having a recurring unit as represented by the following formula:

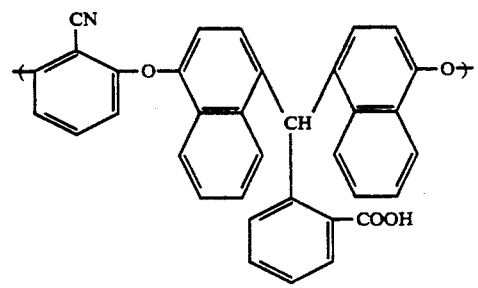

It was further found that the resulting polymer generates a strong fluorescence in a blue color at 475 nm, when irradiated with ultraviolet rays having the wavelength of 320 nm to 420 nm.

EXAMPLE 9

The procedures of Example 7 were followed in substantially the same manner with the exception that 11.239 grams (0.08 moles) of 2,6-difluorobenzonitrile, 8.41 grams of (0.02 moles) of 1-naphtholphthalin, 13.68 grams (0.06 moles) of 2,2-bis(4-hydroxyphenyl)propane, 24.9 grams of potassium carbonate, and 100 ml of N-methylpyrrolidone were used and the heating time after removal of toluene was changed to 1 hour, yielding 29.5 grams of a polymer (yield: 98%).

The polymer has been found to have a reduced viscosity of 0.89 dl/gram in N-methylpyrrolidone (0.2 grams/dl) at 30° C., a glass transition temperature of 221° C., and a thermal decomposition temperature of 401° C. (in air, a weight loss of 5%). The infrared absorption spectrum of the resulting polymer indicated absorption peaks at 1,240 cm$^{-1}$ on the basis of the ether linkage and at 2,250 cm$^{-1}$ on the basis of the nitrile group.

The resulting polymer was confirmed to be an aromatic polyether having a recurring unit as represented by the following formula:

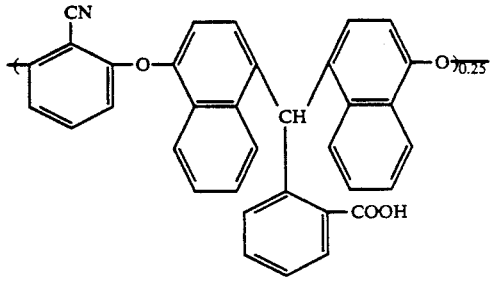

-continued

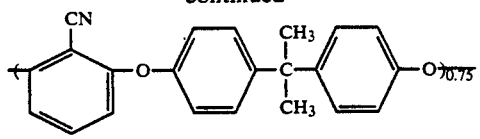

It was further found that the resulting polymer generates a strong fluorescence in a blue color at 475 nm, when irradiated with ultraviolet rays having the wavelength of 320 nm to 420 nm.

EXAMPLE 10

Into a 1-liter separable flask equipped with a stirrer, an argon gas blowing tube, and a Dean & Stark trap filled with toluene, 50.58 grams (0.36 moles) of 2,6-difluorobenzonitrile, 115.32 grams (0.36 moles) of phenolphthalin, 82.1 grams (0.594 moles) of potassium carbonate, and 450 ml of N,N'-dimethylimidazolidinone were placed. The temperature of the mixture was elevated from room temperature to 190° C. over the period of 45 minutes while argon gas was blown thereinto with stirring. The mixture was further maintained for 75 minutes at that temperature.

After the reaction mixture was cooled, it was poured into an aqueous oxalic acid solution to precipitate a product which, in turn, was crushed with a blender. The crushed material was then washed three times with water, yielding 43.0 grams of a polymer which has the recurring unit of the same chemical structure as that obtained in Example 1.

The polymer has been found to have a reduced viscosity of 0.25 dl/gram in N-methylpyrrolidone (0.2 grams/dl) at 30° C., a glass transition temperature of 212° C., and a thermal decomposition temperature of 390° C. (in air, weight loss of 5%).

Its NMR and infrared spectra confirms that the polymer is an aromatic polymer having the recurring unit having the following chemical structure:

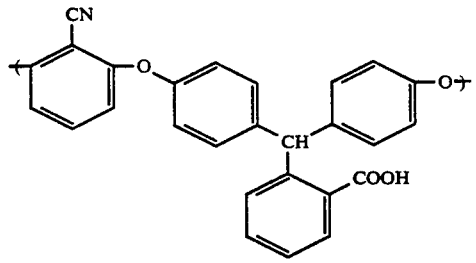

The aromatic polyether obtained hereinabove (20 grams) was then dissolved in 80 ml of N-methylpyrrolidone, and 11.25 grams of phenyl chloroformate was gradually added to the solution. The temperature in the flask arose from 20° C. to 43° C., generating gases violently. The mixture was allowed to stand with stirring at room temperature for 4 hours.

The resulting reaction mixture was poured into 1 liter of methanol to precipitate a solid material which, in turn, was washed three times with 1 liter of methanol and dried yielding a powdery product in the yield of 21.8 grams (92%).

The powdery product was found to have a reduced viscosity of 0.42 dl/g, when measured in N-methylpyrrolidone (0.2 g/dl) at 30° C., a glass transition temperature of 166° C., and a thermal decomposition temperature of 410° C. (in air, a weight loss of 5%).

Figure 2:
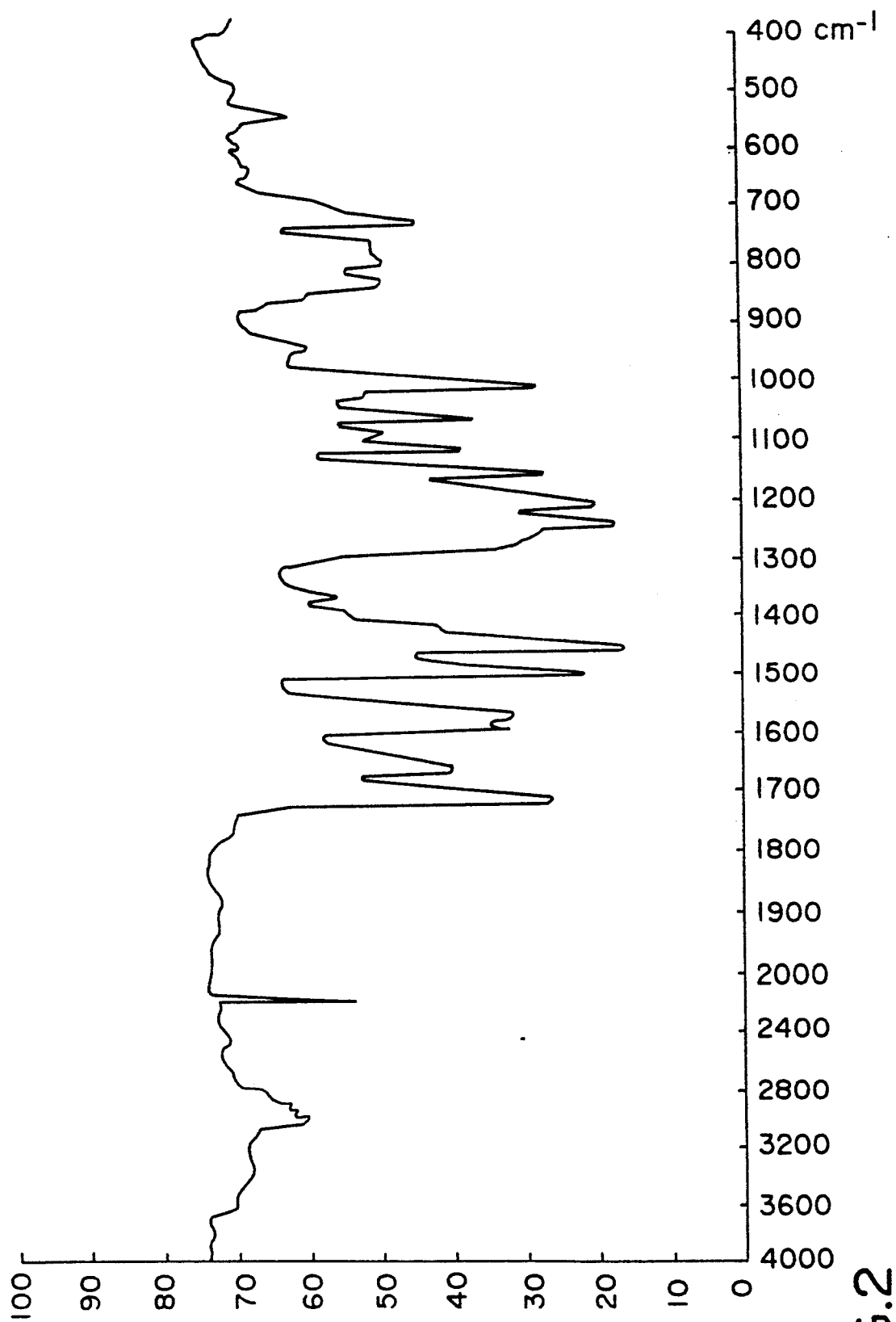
FIGS. 2 and 3 are graphs showing infrared absorption spectra of the aromatic polyethers obtained in Examples 10 and 11, respectively.

The IR absorption spectrum is shown in FIG. 2 and confirms that the product is an aromatic polymer having a recurring unit as represented by the following formula:

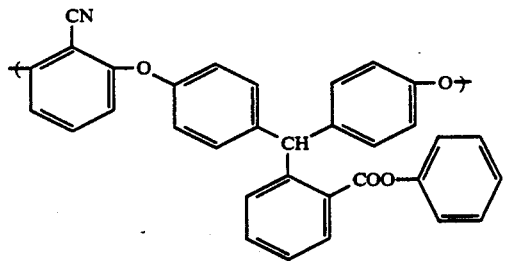

It is further confirmed that the fluorescent spectrum of the polymer has its maximum value at 465 nm and its excitation maximum wavelength is 400 nm.

EXAMPLE 11

The procedures of Example 10 were followed in substantially the same manner with the exception that, in place of phenyl chloroformate, 8.5 grams of phenyl isocyanate was used, yielding 20.8 grams (yield: 88%) of a polymer.

The polymer has been found to have a reduced viscosity of 0.4 dl/gram in N-methylpyrrolidone (0.2 grams/dl) at 30° C., a glass transition temperature of 195° C., and a thermal decomposition temperature of 405° C. (in air, a weight loss of 5%).

Figure 3:
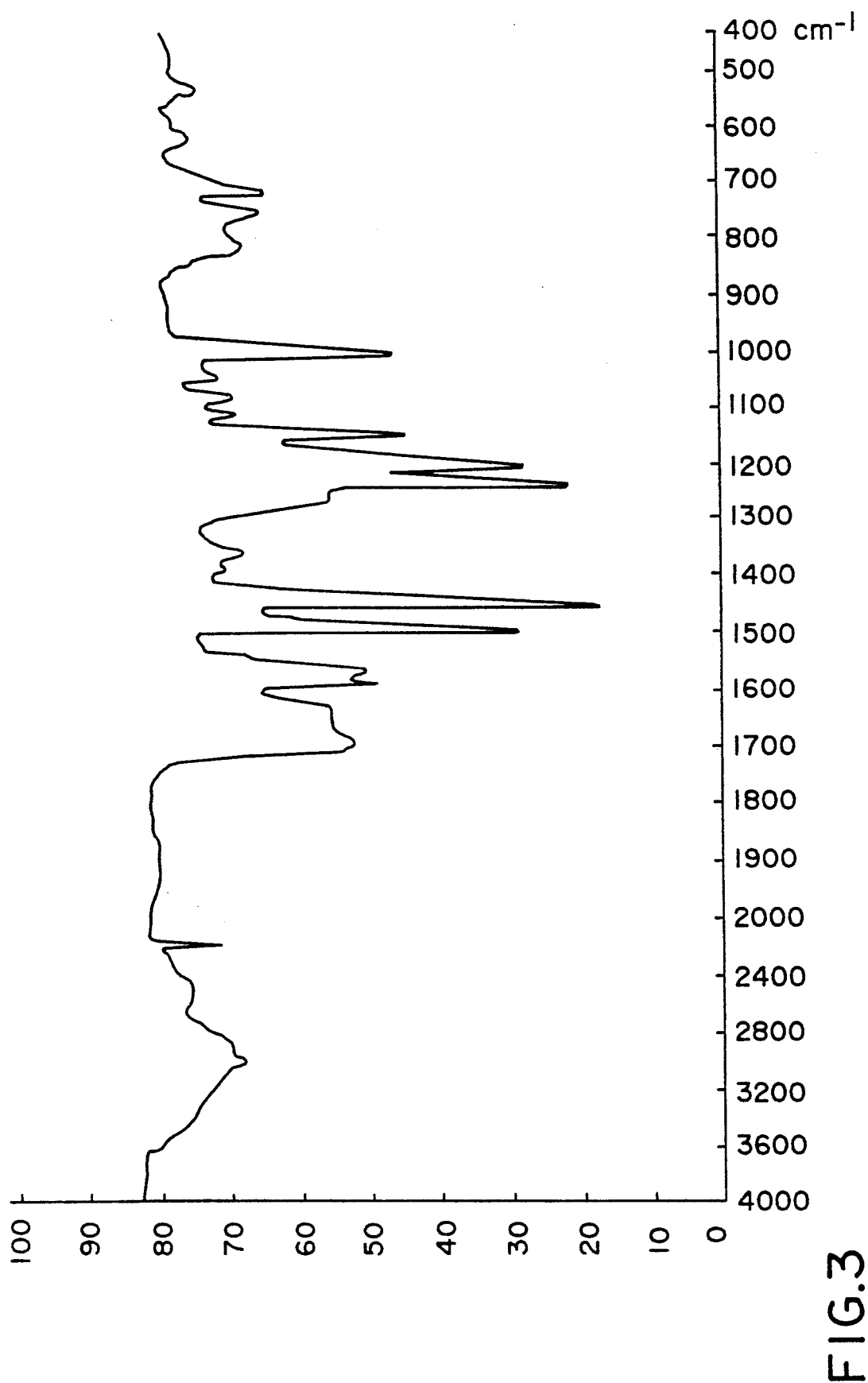

The infrared absorption spectrum of the resulting polymer is shown in FIG. 3 and confirms that the resulting polymer is an aromatic polyether having a recurring unit as represented by the following formula:

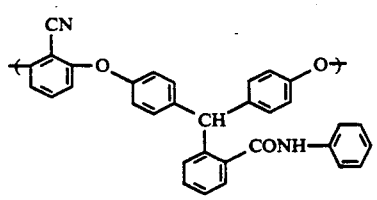

It is further confirmed that the fluorescent spectrum of the polymer has its maximum value at 465 nm and that its excitation maximum wavelength is 400 nm.

EXAMPLE 12

The procedures of Example 10 were followed in substantially the same manner with the exception that, in place of phenyl chloroformate, 8.61 grams of cyclohexyl isocyanate was used, yielding 19.9 grams (yield: 84%) of a polymer.

The polymer has been found to have a reduced viscosity of 0.36 dl/gram in N-methylpyrrolidone (0.2 grams/dl) at 30° C., a glass transition temperature of 292° C., and a thermal decomposition temperature of 397° C. (in air, a weight loss of 5%).

The infrared absorption spectrum of the resulting polymer confirms that the resulting polymer is an aromatic polyether having a recurring unit as represented by the following formula:

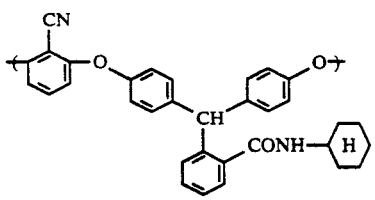

It is further confirmed that the fluorescent spectrum of the polymer has its maximum value at 465 nm and that its excitation maximum wavelength is 400 nm.

EXAMPLE 13

Into a 1-liter separable flask equipped in the same manner as the flask used in an initial stage of Example 10, 104.4 grams (0.36 moles) of 4,4'-dichlorodiphenyl sulfone, 115.32 grams (0.36 moles) of phenolphthalin, 82.1 grams (0.594 moles) of potassium carbonate, and 450 ml of N,N'-dimethylimidazolidinone were placed. The temperature of the mixture was elevated from room temperature to 195° C. over the period of 40 minutes. To the mixture was added 5 ml of toluene, and water produced during the reaction was removed over the period of 90 minutes from the reaction system by reflux of toluene. Toluene was then removed, and the reaction mixture was continued to be heated at that temperature for additional 3 hours with stirring. The reaction mixture was then poured into an aqueous oxalic acid solution to precipitate a product which, in turn, was crushed with a blender. The crushed material was then washed three times with water, yielding 185.7 grams of a powdery polymer which has the recurring unit of the same chemical structure as that obtained in Example 3.

The polymer has been found to have a reduced viscosity of 0.48 dl/gram in N-methylpyrrolidone (0.2 grams/dl) at 30° C., a glass transition temperature of 235° C., and a thermal decomposition temperature of 433° C. (in air, weight loss of 5%).

Its NMR and infrared spectra confirm that the polymer is an aromatic polymer having the recurring unit having the following chemical structure:

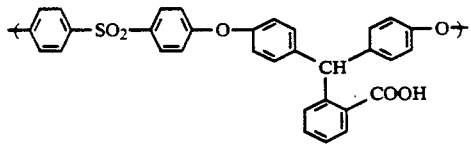

The aromatic polyether obtained hereinabove (20 grams) was then dissolved in 100 ml of N-methylpyrrolidone, and 10 grams of phenyl chloroformate was gradually added to the solution. The temperature in the flask raised from 20° C. to 43° C., generating gases violently. The mixture was allowed to stand with stirring at room temperature for 4 hours.

The resulting reaction mixture was poured into 1 liter of methanol to precipitate a solid material which, in turn, was washed three times with 1 liter of methanol and dried, yielding a powdery product in the yield of 19.5 grams (85%).

The powdery product was found to have a reduced viscosity of 0.59 dl/g, when measured in N-methylpyrrolidone (0.2 g/dl) at 30° C., a glass transition temperature of 185° C., and a thermal decoposition temperature of 445° C. (in air, a weight loss of 5%).

The IR absorption spectrum confirms that the product is an aromatic polymer having a recurring unit as represented by the following formula:

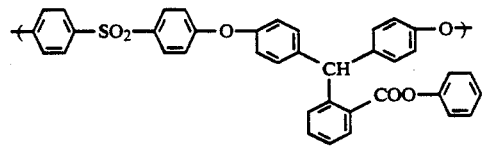

It is further confirmed that the fluorescent spectrum of the polymer has its maximum value at 470 nm. It has an excitation maximum wavelength of 410 nm.

EXAMPLE 14

The procedures of Example 12 were followed in substantially the same manner with the exception that, in place of phenyl chloroformate, 12.0 grams of phenyl isocyanate was used, yielding 20.99 grams (yield: 92%) of a polymer.

The polymer has been found to have a reduced viscosity of 0.53 dl/gram in N-methylpyrrolidone (0.2 grams/dl) at 30° C., a glass transition temperature of 216° C., and a thermal decomposition temperature of 438° C (in air, a weight loss of 5%).

The infrared absorption spectrum of the resulting polymer confirms that the resulting polymer is an aromatic polyether having a recurring unit as represented by the following formula:

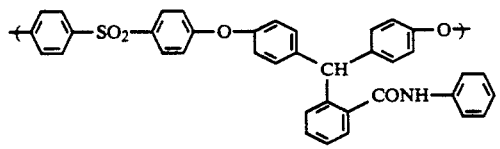

It is further confirmed that the fluorescent spectrum of the polymer has its maximum value at 470 nm and that its excitation maximum wavelength is 410 nm.

EXAMPLE 15

Into a 300-ml separable flask equipped with a stirrer, an argon gas blowing tube, and a Dean & Stark trap, 14.0 grams (0.08 moles) of p-xylylene dichloride, 25.63 grams (0.08 moles) of phenolphthalin, 17.4 grams (0.126 moles) of potassium carbonate, and 100 ml of N-methylpyrrolidone were placed, and the mixture was heated at 130° C. for 2 hours with stirring. After addition of toluene, the temperature of the mixture arose to 150° C. and then water was removed azeotropically. This procedure was continued for 1 hour, and toluene was removed. The mixture was further heated at 150° C. for 1 hour with stirring.

After the reaction mixture was allowed to cool, it was poured into 1.5 liters of an aqueous oxalic acid solution to precipitate a product which, in turn, was crushed with a blender and washed five times with 1 liter of water. After drying, the product in a powdery form was yielded in an amount of 30.8 grams (92%).

The polymer has been found to have a reduced viscosity of 0.39 dl/gram in N-methylpyrrolidone (0.2 grams/dl) at 30° C., a glass transition temperature of 144° C., and a thermal decomposition temperature of 373° C. (in air, weight loss of 5%).

Figure 4:
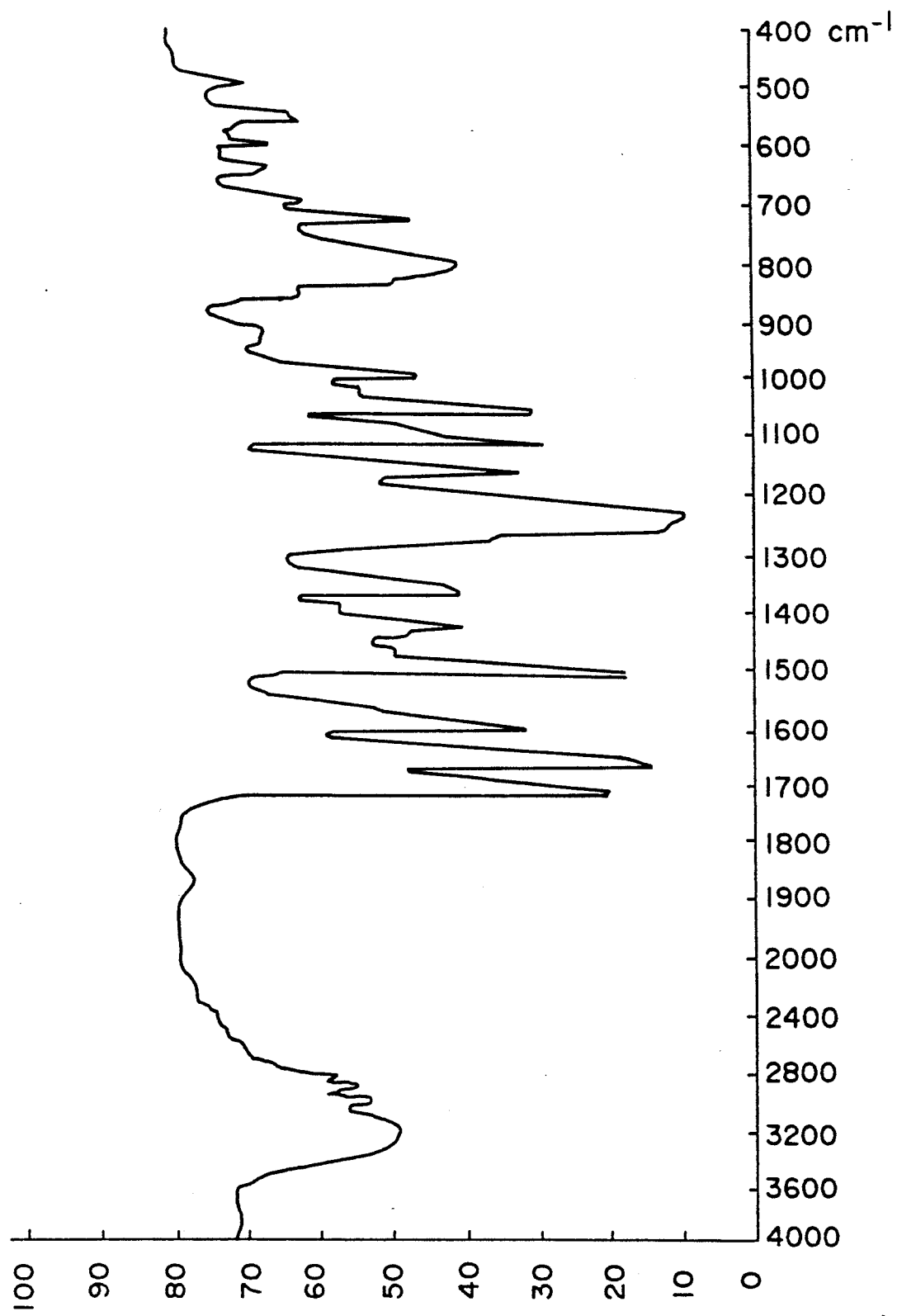
FIG. 4 is a graph showing an infrared absorption spectrum of the aromatic polyether obtained in Example 15 of the present invention.
Figure 5:
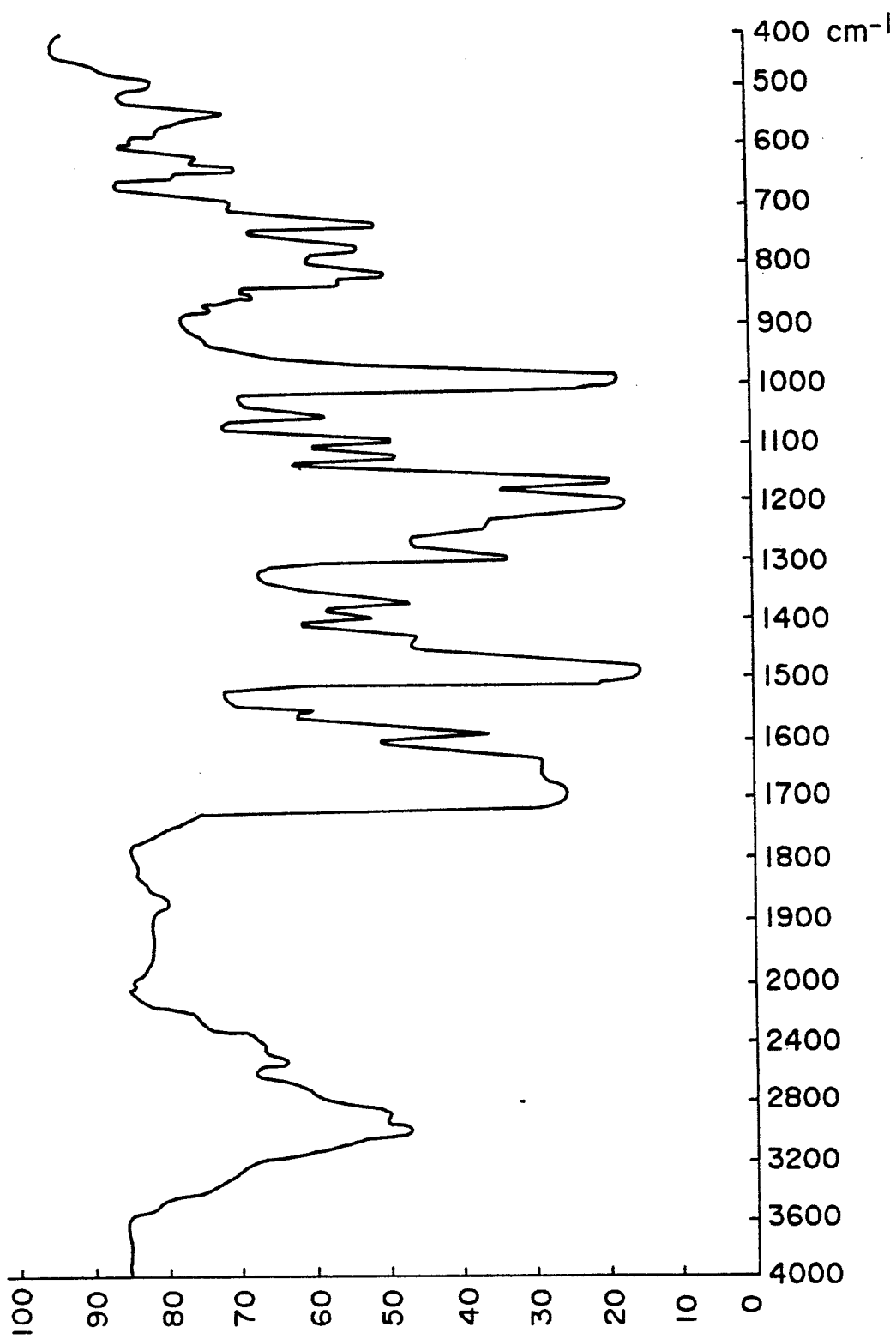
FIG. 5 is a graph showing an infrared absorption spectrum of the aromatic polyether obtained in Example 17 thereof.

Its infrared absorption spectrum is shown in FIG. 4. As shown in FIG. 4, IR absorption bands were indicated at 1,720 cm$^{-1}$ on the basis of the carboxyl group and at 1240 cm$^{-1}$ on the basis of the ether linkage.

The polymer has been confirmed to be an aromatic polyether with a recurring unit as shown hereinbelow:

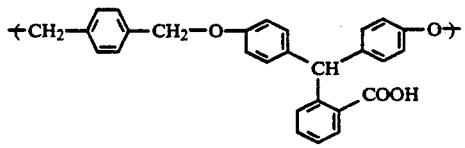

Irradiation of ultraviolet rays at 410 nm produced a fluorescent spectrum having its maximum value at 460 nm.

EXAMPLE 16

The procedures of Example 15 were followed in substantially the same manner with the exception that, in place of phenylphthalin, 34.6 grams of thymolphthalin was used, yielding 38.9 grams (yield: 91%) of a polymer.

The polymer has been found to have a reduced viscosity of 0.46 dl/gram in N-methylpyrrolidone (0.2 grams/dl) at 30° C., a glass transition temperature of 161° C., and a thermal decomposition temperature of 371° C. (in air, a weight loss of 5%).

The infrared absorption spectrum of the resulting polymer confirms that the resulting polymer is an aromatic polyether having a recurring unit as represented by the following formula:

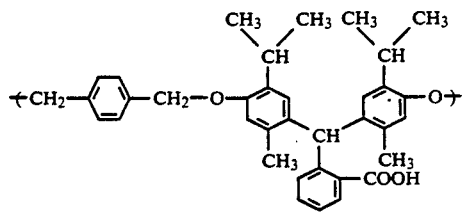

The infrared absorption spectrum of the resulting polymer shows absorption peaks at 1,720 cm$^{-1}$ on the basis of the carboxyl group and at 1,240 cm$^{-1}$ on the basis of the ether linkage. It is further confirmed that the fluorescent spectrum of the polymer has its maximum value at 460 nm when irradiated with ultraviolet rays having a wavelength of 400 nm.

EXAMPLE 17

Into a 300-ml separable flask equipped with a stirrer and a Dimroth condenser, 15.03 grams (0.08 moles) of hexafluorobenzene, 25.63 grams (0.08 moles) of phenolphthalin, 10.391 grams (0.252 moles) of sodium hydroxide, and 100 ml of N-methylpyrrolidone were placed, and the mixture was heated at 80° C. for 6 hours with stirring.

After the reaction mixture was allowed to cool, it was poured into 1.5 liters of an aqueous oxalic acid solution to cause the polymer to precipitate, and the precipitated polymer was then crushed with a blender and washed five times with 1 liter of water. After drying, the polymer was produced in a powdery form in the amount of 34.8 grams (yield: 93%).

The polymer has been found to have a reduced viscosity of 1.32 dl/gram in N-methylpyrrolidone (0.2 grams/dl) at 30° C., a glass transition temperature of 216° C., and a thermal decomposition temperature of 389° C. (in air, a weight loss of 5%).

The infrared absorption spectrum of the resulting polymer confirms that the resulting polymer is an aromatic polyether having a recurring unit as represented by the following formula:

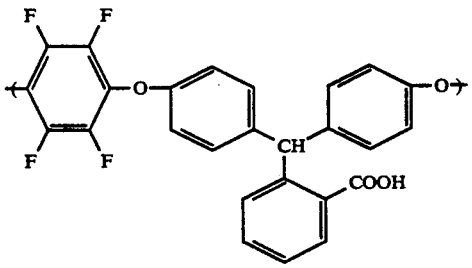

The infrared absorption spectrum of the resulting polymer shows absorption peaks at 1,700 cm$^{-1}$ on the basis of the carboxyl group and at 1,210 cm$^{-1}$ on the basis of the ether linkage. It is further confirmed that the fluorescent spectrum of the polymer at 460 nm is generated, when irradiated with ultraviolet rays having wavelength of 400 nm to 420 nm.

EXAMPLE 18

The procedures of Example 15 were followed in substantially the same manner with the exception that, in place of phenylphthalin, 34.6 grams of thymolphthalin was used, yielding 42.3 grams (yield: 91%) of a polymer. The polymer has been found to have a reduced viscosity of 1.53 dl/gram in N-methylpyrrolidone (0.2 grams/dl) at 30° C., a glass transition temperature of 229° C., and a thermal decomposition temperature of 378° C. (in air, a weight loss of 5%).

The infrared absorption spectrum of the resulting polymer confirms that the resulting polymer is an aromatic polyether having a recurring unit as represented by the following formula:

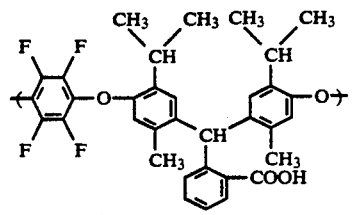

The infrared absorption spectrum of the resulting polymer shows absorption peaks at 1,700 cm$^{-1}$ on the basis of the carboxyl group and at 1,210 cm$^{-1}$ on the basis of the ether linkage. It is further confirmed that the fluorescent spectrum of the polymer has its maximum value at 460 nm when irradiated with ultraviolet rays having a wavelength of 400 nm. Furthermore, it is confirmed that the polymer increased its fluorescent intensity when heated to 250° C. or higher.

EXAMPLE 19

Into a 300-ml reactor equipped with a Dean & Stark trap filled with toluene, a stirrer, and an argon gas blowing tube, 38.441 grams (0.120 moles) of phenolphthalin, 17.759 grams (0.120 moles) of 2,6-dichloropyridine, 29.853 grams of potassium carbonate, and 150 ml of N,N'-dimethylpyrrolidone were placed. The solid materials were dissolved while blowing argon gas in the reactor at room temperature. The reactor was then heated to 195° C. over the period of 50 minutes in an oil bath and, at this stage, a small quantity of toluene was added thereto. After reflux for 1 hour, the toluene was removed and the mixture was heated at 200° C. for 4 hours to complete the reaction.

After completion of the reaction, the reaction mixture was allowed to cool to 90° C. and then poured into concentrated oxalic acid aqueous solution to allow a polymer to precipitate. The precipitated material was then crushed with a blender and washed three times with 1 liter of warm water and once with 1 liter of methanol. After drying, the polymer was yielded in a powdery form in the amount of 46.0 grams (97%).

The polymer has been found to have a reduced viscosity of 0.7 dl/gram, when measured in N-methylpyrrolidone (0.2 grams/dl) at 30° C. and a glass transition temperature of 187° C., when measured by the differential scanning calorimeter.

Figure 6:
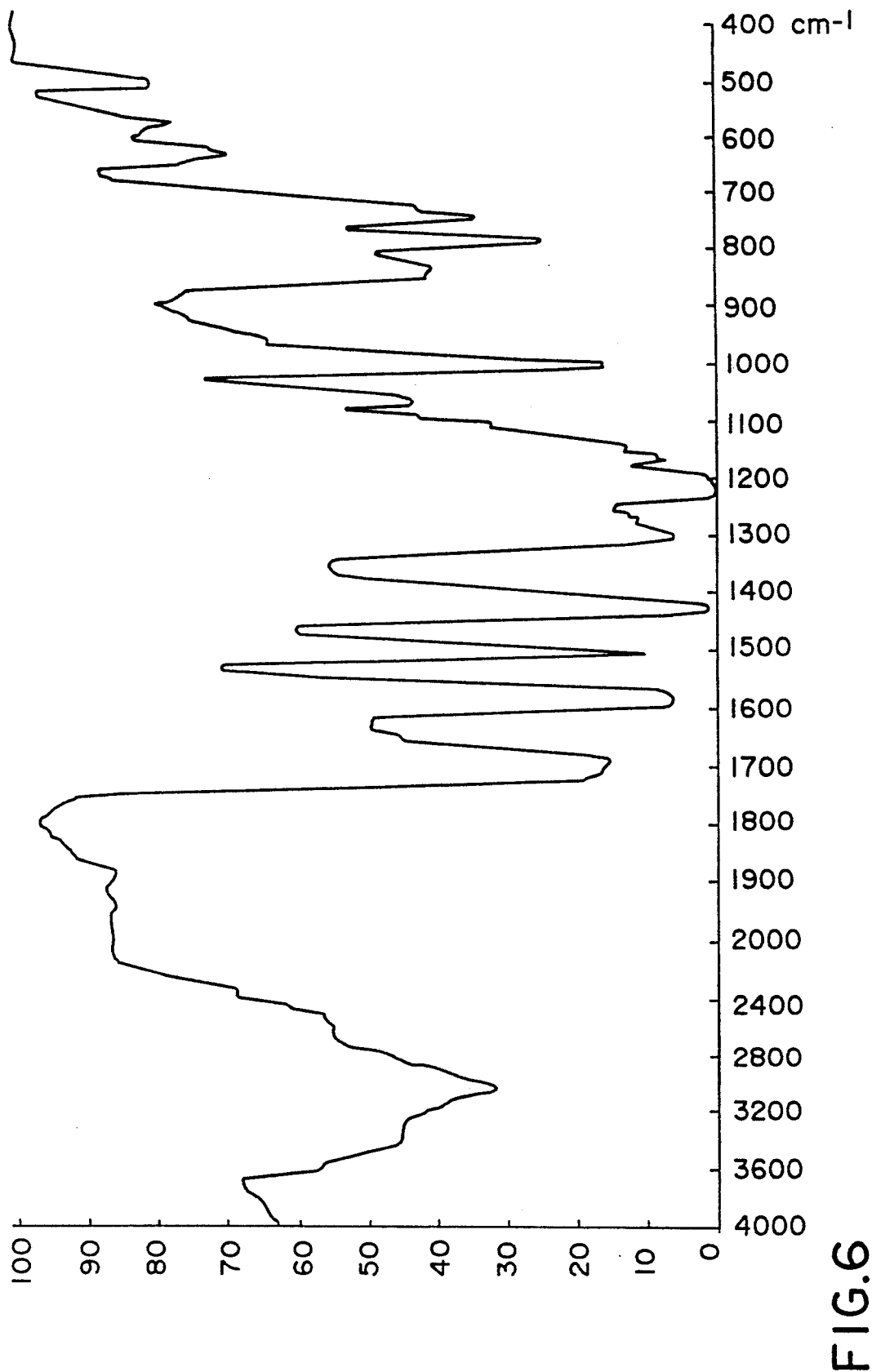
FIGS. 6 and 7 are graphs showing infrared absorption spectra of the aromatic polyethers obtained in Examples 19 and 20, respectively.

As shown in FIG. 6, its infrared absorption spectra reveals that the polymer has absorption peaks at 1,700 $cm^{-1}$ on the basis of the carboxyl group and at 1,240 $cm^{-1}$ on the basis of the ether linkage and further that the polymer has the recurring unit having the following chemical structure:

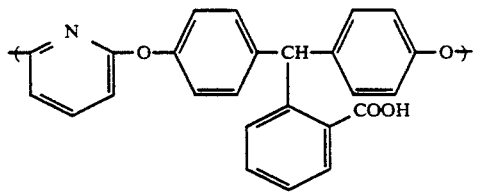

The aromatic polyether produced a strong fluorescence in a green color at 475 nm when irradiated with light having the wavelength of 430 nm.

EXAMPLE 20

The procedures of Example 19 were followed in substantially the same manner with the exception that, in place of dichloropyridine and phenolphthalin, 5.000 grams (43.4 millimoles) of 2,6-difluoropyridine and 18.794 grams (43.4 millimoles) of thymolphthalin were used, respectively, the amount of potassium carbonate was reduced from 29.853 grams to 10.809 grams (78.2 millimoles), and the amount of N-methylpyrrolidone is reduced from 150 ml to 100 ml, yielding 21.4 grams (yield: 97%) of a powdery polymer.

The polymer has been found to have a reduced viscosity of 0.5 dl/gram, when measured in N-methylpyrrolidone (0.2 grams/dl) at 30° C. and a glass transition temperature of 197° C., when measured by the differential scanning calorimeter.

Figure 7:
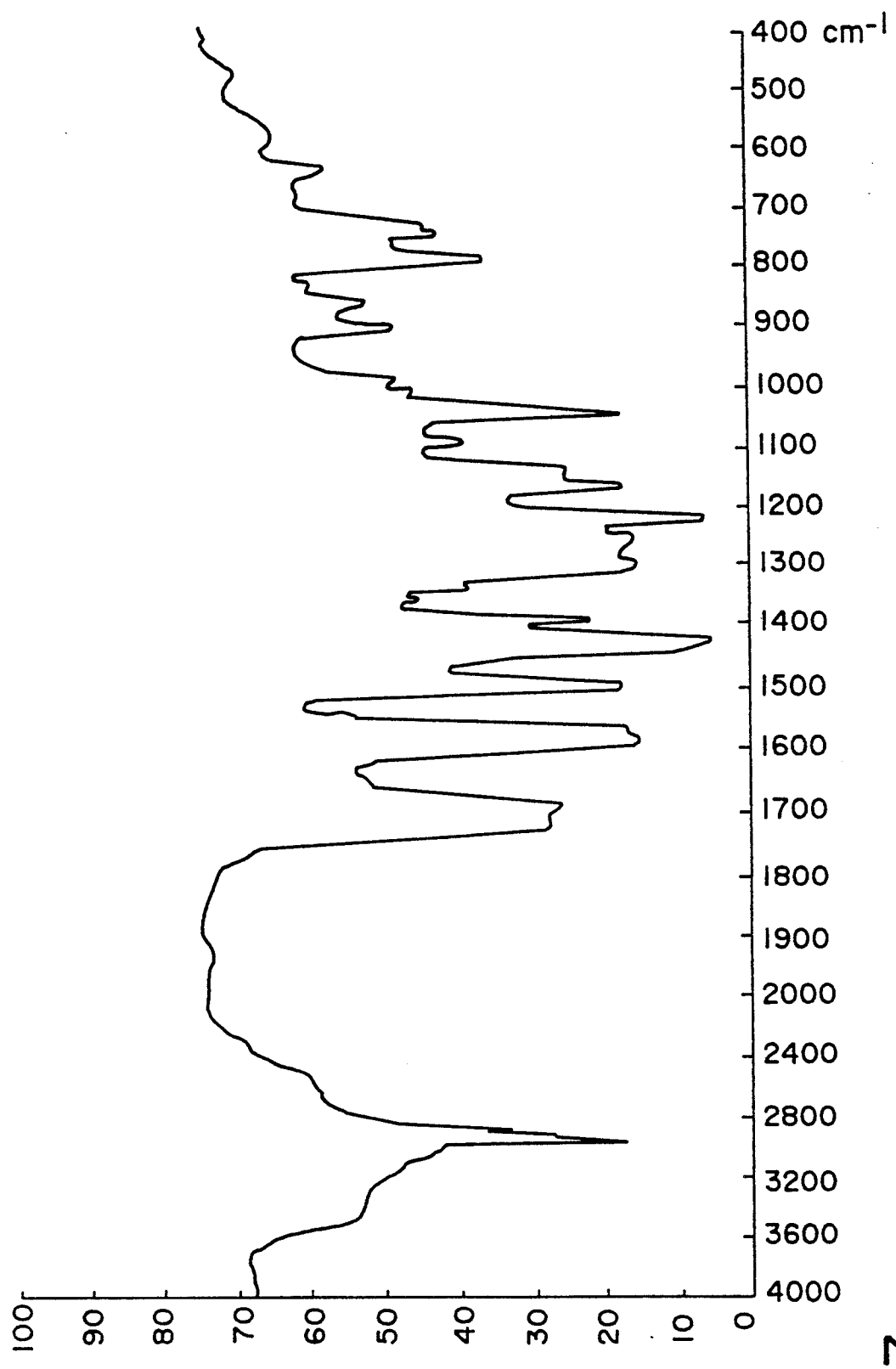

As shown in FIG. 7, its infrared absorption spectra reveals that the polymer is has absorption peaks at 1,690 $cm^{-1}$ on the basis of the carboxyl group and at 1,220 $cm^{-1}$ on the basis of the ether linkage and further that the polymer has the recurring unit having the following chemical structure:

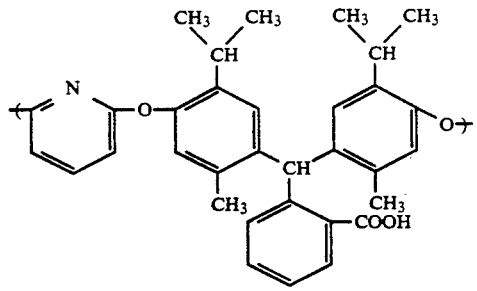

The aromatic polyether produced a strong fluorescence in a green color at 480 nm when irradiated with light having the wavelength of 410 nm.

EXAMPLE 21

Into a 1-liter reactor equipped with a stirrer, a rectifier, and an argon gas blowing tube, 92.81 grams of 4,4'-dichlorodiphenyl sulfone, 102.52 grams of phenolphthalin, 73 grams of potassium carbonate, and 400 ml of N-methylpyrrolidone were charged, and the mixture was reacted at 200° C. for 6 hours, yielding a product in the amount of 158 grams.

The product was identified to be an aromatic polymer with a recurring unit having the same chemical structure as that obtained in Example 3. The polymer was found to have a reduced viscosity of 0.41 dl/g, when measured in N-methylpyrrolidone (0.2 g/liter) at 30° C., a glass transition temperature (Tg) of 234° C., and a thermal decomposition temperature (Td) of 435° C.

EXAMPLE 22

The procedures of Example 21 were followed in substantially the same manner with the exception that, in place of 4,4'-dichlorodiphenyl sulfone, 44.51 grams of 2,6-difluorobenzonitrile was used and the reaction time at 200° C. was shortened from 6 hours to 2 hours, yielding 129 grams of a product.

The product was identified to be an aromatic polymer with a recurring unit having the same chemical structure as that obtained in Example 1. The polymer was found to have a reduced viscosity of 0.67 dl/g, when measured in N-methylpyrrolidone (0.2 g/liter) at 30° C., a glass transition temperature (Tg) of 229° C., and a thermal decomposition temperature (Td) of 435° C.

EXAMPLE 23

The procedures of Example 21 were followed in substantially the same manner with the exception that, in place of phenolphthalin, 69.2 grams of thymolphthalin and 36.5 grams of bisphenol A were used, yielding 165 grams of a product.

The product was identified to be an aromatic polymer with a recurring unit as represented by the following formula:

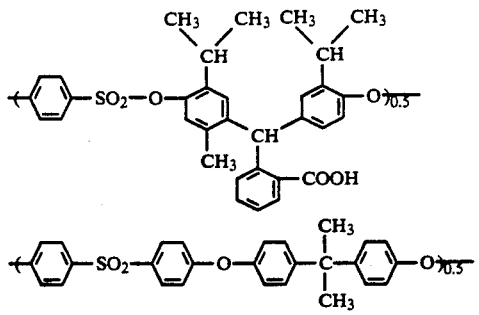

The polymer was further found to have a reduced viscosity of 0.48 dl/g, when measured in N-methylpyrrolidone (0.2 g/liter) at 30° C., a glass transition temperature (Tg) of 227° C., and a thermal decomposition temperature (Td) of 395° C.

EXAMPLE 24

Into a 1-liter reactor equipped with a stirrer, a rectifier, and an argon gas blowing tube, 92.81 grams of 4,4'-dichlorodiphenyl sulfone, 102.52 grams of phenolphthaline, 73 grams of potassium carbonate, and 400 ml of N-methylpyrrolidone were charged, and the mixture was reacted at 200° C. for 4 hours, yielding a product in the amount of 158 grams.

The product was identified to be an aromatic polymer with a recurring unit having the same chemical structure as that obtained in Example 3. The polymer was found to have a reduced viscosity of 0.41 dl/g, when measured in N-methylpyrrolidone (0.2 g/liter) at 30° C., a glass transition temperature (Tg) of 234° C., and a thermal decomposition temperature (Td) of 435° C. (in air; a weight loss of 5%).

EXAMPLES 25–27

A fluorescent resin composition was prepared by admixing the polymer obtained in Example 21 with a thermoplastic resin ("Idemitusu Polycarbonate FN-2500", produced by Idemitsu Petrochemicals Co., Ltd.) at temperatures ranging from 300° C. for 5 minutes at the rate, as shown in Table 1 below, and by molding the resulting mixture using a mini-mix molder (manufacture by CSI, Inc.).

As shown in Table below, the resulting resin compositions were measured for their tensile strength, tensile modulus of elasticity, and ratings of fluorescence.

COMPARATIVE EXAMPLE 1

The procedures were carried out in the same manner as in Example 25 to produce a fluorescent resin composition which, in turn, demonstrated the following properties as shown in Table below.

EXAMPLE 28

The polymer obtained in Example 22 in the amount of 5% by weight was admixed with a polyester ("U Polymer U-100", produced by Unitika K. K.) and molded in substantially the same manner as in Example 25. The resulting resin composition demonstrated the properties as shown in Table below.

EXAMPLE 29

The polymer obtained in Example 22 in the amount of 5% by weight was admixed with a polysulfone ("UDEL P-1700", prouced by AMOCO) and molded in substantially the same manner as in Example 25. The resulting resin composition demonstrated the properties as shown in Table below.

EXAMPLE 30

The polymer obtained in Example 23 in the amount of 5% by weight was admixed with a polysulfone ("UDEL P-1700", prouced by AMOKO) and molded in substantially the same manner as in Example 25. The resulting resin composition demonstrated the properties as shown in Table below.

TABLE

| Examples | Weight of Polymer(%) | Tensile Strength (kg/cm$^2$) | Tensile Modulus of Elasticity (kg/cm$^2$) | Ratings of Fluorescence |
|---|---|---|---|---|
| 25 | 25 | 600 | 20,000 | Strong |
| 26 | 5 | 620 | 20,000 | Strong |
| 27 | 2 | 630 | 22,000 | Strong |
| 28 | 5 | 730 | 23,000 | Strong |
| 29 | 5 | 780 | 21,000 | Strong |
| 30 | 5 | 780 | 21,000 | Strong |
| Comparative Ex. 1 | 0.5 | 630 | 22,000 | Weak |

EXAMPLE 31

Twenty parts by weight of the polymer obtained in Example 24 above and 1 part by weight of tris(1,1,1,2,2,3,3-heptafluoro-7,7-dimethyl-4,6-octadionate)europeum complex were dissoved in 50 parts by weight of dimethyl acetamide, and the solution was placed on a glass plate and evaporated to form a film.

The film was found to be transparent and colorless under fluorescent lightening, solar radiation, and mercury vapor lamp and to generate fluorescence in a red color when ultraviolet rays with 250 nm were irradiated and in a blue color when ultraviolet rays with 360 nm were irradiated.

The fluorescent spectrum demonstrated fluorescent maximum wavelength of 615 nm (excited maximum wavelength of 310 nm) and of 440 nm (excited maximum wavelength of 400 nm).

EXAMPLE 32

The procedures of Example 31 were followed with the exception that, in place of tris(1,1,1,2,2,3,3-heptafluoro-7,7-dimethyl-4,6-octadionate)europeum complex and the polymer obtained in Example 21, tris(-dipyvaromethanate)europeum complex and the polymer obtained in Example 22 were used. A film was prepared in the same manner as in Example 31 and found to generate fluorescence in a green color.

The fluorescent spectrum demonstrated fluorescent maximum wavelength of 615 nm (excited maximum wavelength of 310 nm) and of 440 nm (excited maximum wavelength of 400 nm).

EXAMPLE 33

The procedures of Example 31 were followed with the exception that, in place of tris(1,1,1,2,2,3,3-heptafluoro-7,7-dimethyl-4,6-octadionate)europeum complex and the polymer obtained in Example 21, europeum chloride and the polymer obtained in Example 8 were used. A film was prepared in the same manner as in Example 31 and found to generate fluorescence in a yellow color.

The fluorescent spectrum demonstrated fluorescent maximum wavelength of 615 nm (excited maximum wavelength of 310 nm) and of 440 nm (excited maximum wavelength of 400 nm).

COMPARATIVE EXAMPLES 2-4

The europeum compounds used in Examples 31 to 33, respectively, were irradiated with ultraviolet rays at 250 nm, generating a weak fluorescence.

As have been described hereinabove, the aromatic polyethers according to the present invention are excellent in mechanical properties and solvent resistance and high in glass transition temperature as high as 210° C. to 250° C. as well as strong in fluorescence generated. They are accordingly useful as engineering resins and suitable for use with materials for parts and display materials applicable to the electric and electronic, mechanical field, and automobile fields and many other fields.

As the fluorescent resin compositions according to the present invention are made of the aromatic polyethers which have a particular recurring unit as have been described hereinabove and which have a particular reduced viscosity, they are excellent in thermal resistance and easy in manufacturing. Furthermore, they have their own ability of generanting fluorescence so that they do not require an addition of a fluorescent substance, causing no bleeding of the fluorescent substance added, unlike conventional fluorescent resin compositons. Thus, they are extremely useful industrially as materials for parts and display materials for use in the electric, electronic, mechanical, optic, automobile and other fields as well as decorative materials and molding materials for toys.

Furthermore, the fluorescent resin compositions containing a europeum compound has the improved fluorescent characteristics because the europeum compound itself also has the ability of generating fluorescence, thus increasing an intensity of fluorescence and generating a plurality of fluorescence in accordance with excited wavelengths.

The process according to the present invention is also practically useful for preparing the aromatic polyethers as represented by the general formula [I] above because it is simpler and easier than conventional processes as well as it can use raw materials which are readily available on the market, thus producing efficiently the aromatic polyethers.

What is claimed is:

1. A fluorescent resin composition comprising an aromatic polyether having a recurring unit as represented by following general formula [I]:

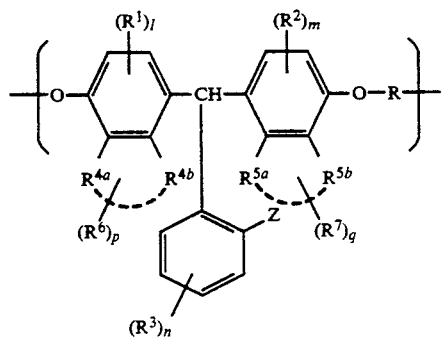

in which R stands for a formula represented by the following:

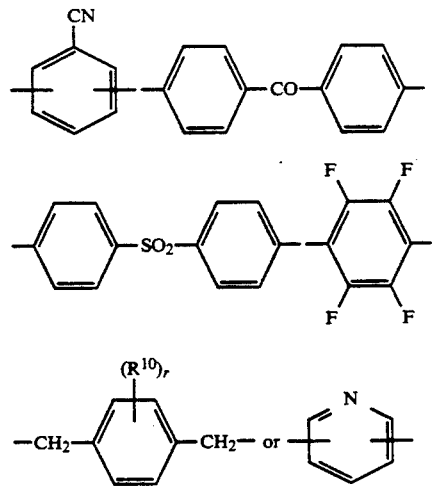

($R^{10}$ stands for a halogen atom, a lower alkyl group having from 1 to 6 carbon atoms, a lower alkoxy group having from 1 to 6 carbon atoms, an aryl group having from 6 to 8 carbon atoms or an aryloxy group having from 6 to 8 carbon atoms and r is 0 or an integer from 1 to 4);

$R^1$ and $R^2$ are identical to or different from each other and stand each for a halogen atom, a lower alkyl group having from 1 to 6 carbon atoms, a lower alkoxy group having from 1 to 6 carbon atoms, an aryl group having from 6 to 8 carbon atoms, or an aryloxy group having from 6 to 8 carbon atoms;

$R^3$ stands for a halogen atom, a carboxyl group, a lower alkyl group having 1 to 6 carbon atoms, a lower alkoxy group having 1 to 6 carbon atoms, an aryl group having 6 to 8 carbon atoms, or an aryloxy group having 6 to 8 carbon atoms;

$R^{4a}$ and $R^{4b}$ are identical to or different from each other and stand each for a hydrogen atom, $R^1$ or $R^2$ or, when taken together, for a 1,3-butadienylene group;

$R^{5a}$ and $R^{5b}$ are identical to or different from each other and stand each for a hydrogen atom, $R^1$ or $R^2$ or, when taken together, for a 1,3-butadienylene group;

$R^6$ and $R^7$ are identical to or different from each other and stand each for a halogen atom, a lower alkyl group having from 1 to 6 carbon atoms or an aryl group having from 6 to 8 carbon atoms;

Z stands for a carboxyl group, —$COOR^8$ or —$CONHR^9$ (wherein $R^8$ and $R^9$ are identical to or different from each other or stand each for a lower alkyl group having 1 to 6 carbon atoms, a lower cycloalkyl group having from 3 to 8 carbon atoms or an aryl group having 6 to 8 carbon atoms);

l and m are each 0, 1 or 2;

n is 0 or an integer from 1 to 4; and p and q is 0 or an integer from 1 to 4.

and which has a reduced viscosity of 0.1 dl/g or higher when measured in N-methylpyrrolidone in the concentration of 0.2 g/dl at 30° C.

2. A fluorescent resin composition as claimed in claim 1, further comprising a thermoplastic resin selected from the group consisting of poly-carbonate, polystyrene, polyethylene, polypropylene, poly(methyl methacrylate), polysulfone, poly(ether sulfone), poly(ether imide), poly(ether ether ketone), poly(cyanoaryl ether), poly(ethylene terephthalate), poly(butylene terephthalate), aromatic polyester, polyamide and poly(vinyl chloride), and the aromatic polyether is present in an amount ranging from 1 to 99% by weight with respect to the thermoplastic resin.

3. A fluorescent resin composition as claimed in claim 1, further comprising an europeum compound selected from the group consisting of europeum oxide, europeum hydroxide, europeum carbonate, europeum oxalate, europeum chloride, europeum fluoride, europeum bromide, europeum nitrate, europeum sulfate, europeum acetate, europeum pyrohydrochloride, europeum phosphate, metal europeum, tris(dimethyloctandionate)europeum, tris(dipyvaromethanate)europeum and tris((tert-butylhydroxymethylene)camphaorate)europeum.

4. A fluorescent resin composition as claimed in claim 3, wherein the europeum compound is used at a rate ranging from 0.001 part by weight to 10 parts by weight with respect to the aromatic polyether.

5. A process for preparing a fluorescent resin composition which comprises blending an aromatic polyether having a recurring unit as represented by general formula (I) of claim 1 with a thermoplastic resin in an amount ranging from 1 to 99% by weight with respect to the thermoplastic resin, wherein the thermoplastic resin is selected from the group consisting of polycarbonate, polystyrene, polyethylene, polypropylene, poly(methyl methacrylate), polysulfone, poly(ether sulfone), poly(ether imide), poly(ether ether ketone), poly(cyanoaryl ether), poly(ethylene terephthalate), poly(butylene terephthalate), aromatic polyester, polyamide and poly(vinyl chloride).

6. A process for preparing a fluorescent resin composition which comprises blending an aromatic polyether having a recurring unit as represented by general formula (I) of claim 1 with a europeum compound selected from the group consisting of europeum oxide, europeum hydroxide, europeum carbonate, europeum oxalate, europeum chloride, europeum fluoride, europeum bromide, europeum nitrate, europeum sulfate, europeum acetate, europeum pyrohydrochloride, europeum phosphate, metal europeum, tris(di-methyloctandionate)europeum, tris(dipyvaromethanate)europeum and tris europeum.

* * * * *